United States Patent [19]

Grenier

[11] Patent Number: 4,502,033
[45] Date of Patent: Feb. 26, 1985

[54] CIRCUIT CONTROL DEVICE

[75] Inventor: Aime J. Grenier, N. Attleboro, Mass.

[73] Assignee: Texas Instruments Incorporated, Dallas, Tex.

[21] Appl. No.: 395,534

[22] Filed: Jul. 6, 1982

[51] Int. Cl.³ .......................................... H01H 71/16
[52] U.S. Cl. ...................................... 337/75; 337/78; 337/101
[58] Field of Search ...................... 335/44, 13, 21, 22, 335/24, 25, 27, 30, 42, 110, 115, 126, 131, 138, 139, 164, 165, 166, 167, 170, 174, 190, 251, 262, 264; 74/2; 200/61.53; 337/75, 78, 99, 101

[56] References Cited

U.S. PATENT DOCUMENTS

| | | | |
|---|---|---|---|
| 2,068,668 | 1/1937 | Frank et al. | 337/75 |
| 2,416,169 | 2/1947 | Freese | 337/75 |
| 2,501,363 | 3/1950 | Toth et al. | 337/75 |
| 2,579,252 | 12/1951 | Fisher | 337/75 |
| 2,757,258 | 7/1956 | Jorgensen | 337/101 |
| 2,892,054 | 6/1959 | Walker et al. | 335/43 |
| 2,912,546 | 11/1959 | Arey | 200/116 |
| 3,165,609 | 1/1965 | Norden | 335/44 |
| 3,234,348 | 2/1966 | Desio | 337/101 |
| 3,361,882 | 1/1968 | Clarke | 200/116 |
| 3,651,436 | 3/1972 | Cooper et al. | 335/43 |
| 3,731,239 | 5/1973 | Ellenberger | 335/22 |
| 3,949,331 | 4/1976 | Cellerini et al. | 335/45 |
| 3,950,717 | 4/1976 | Cellerini et al. | 335/45 |
| 4,317,094 | 2/1982 | Peterson | 335/13 |

Primary Examiner—William M. Shoop
Assistant Examiner—Jeffrey Sterrett
Attorney, Agent, or Firm—John A. Haug; James P. McAndrews; Melvin Sharp

[57] ABSTRACT

A remotely controlled circuit control device has first and second load contact assemblies movable into circuit engagement and circuit disengagement positions relative to one another in which one load contact assembly is operatively connected to a solenoid so that alternate forward strokes of the solenoid moves the one load contact assembly between reset and tripped positions through a push-push mechanism having an indexing portion and a latching portion. An overload mechanism cooperates with the latch portion to cause the load contact assemblies to move to the circuit disengaged position upon occurrence of a fault condition. The second load contact assembly includes pivotably mounted contact members which are linked to the first load contact assembly in such a way that circuit engagement during solenoid energization is precluded. The push-push mechanism is operatively connected via a mode switch to either a reset circuit or a trip circuit and in turn to a remotely disposed indicator-control unit (ICU) through an optical coupler. Contact status and coordination between load contacts and ICU contacts are provided by a feedback circuit. An interface circuit allows operation of the circuit control device without discrimination on a power supply of either alternating or direct voltage or both. Life expectancy of the device is enhanced by several features including double break contacts with contact wiping and the provision of a floating output arm for the solenoid.

9 Claims, 30 Drawing Figures

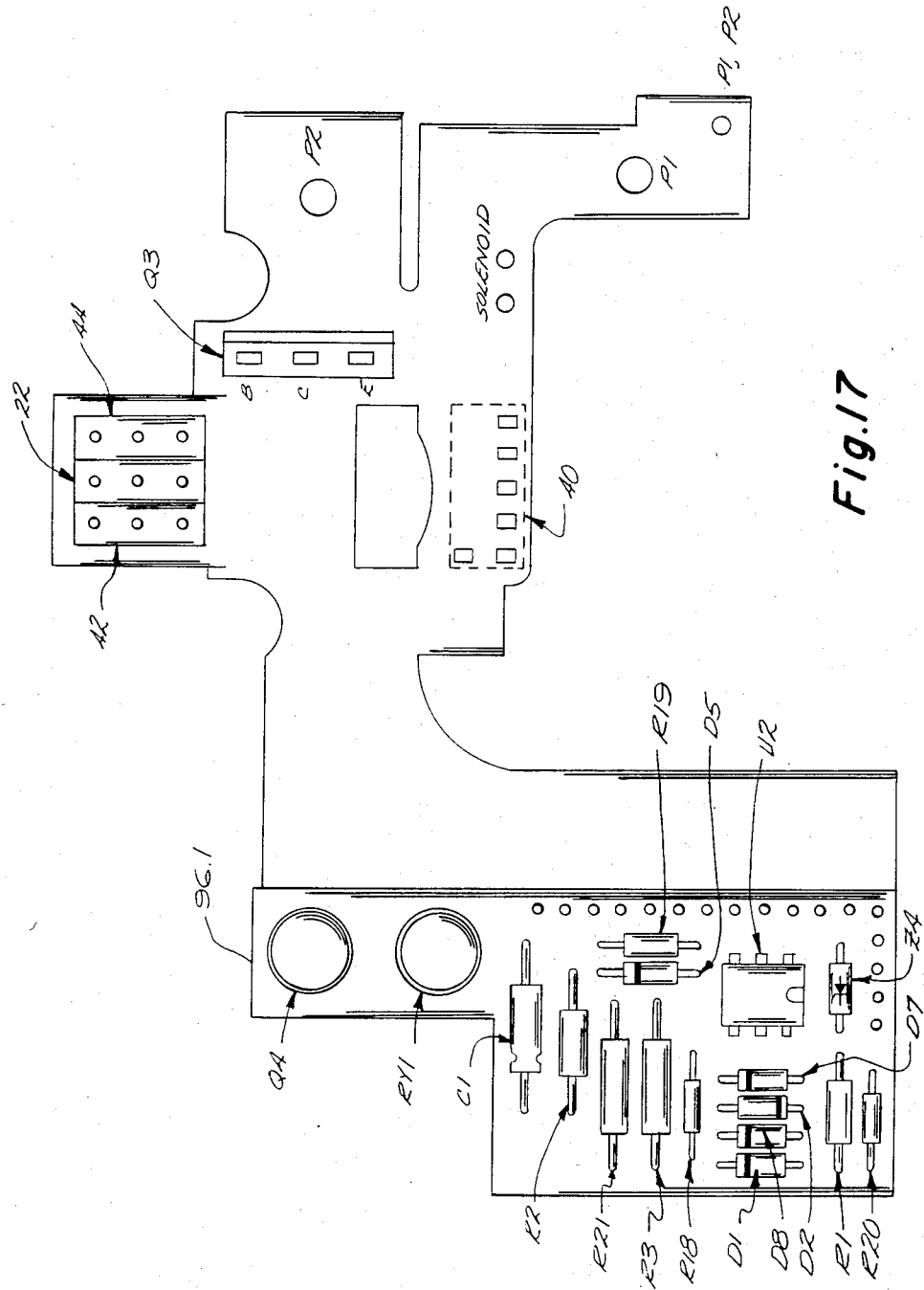

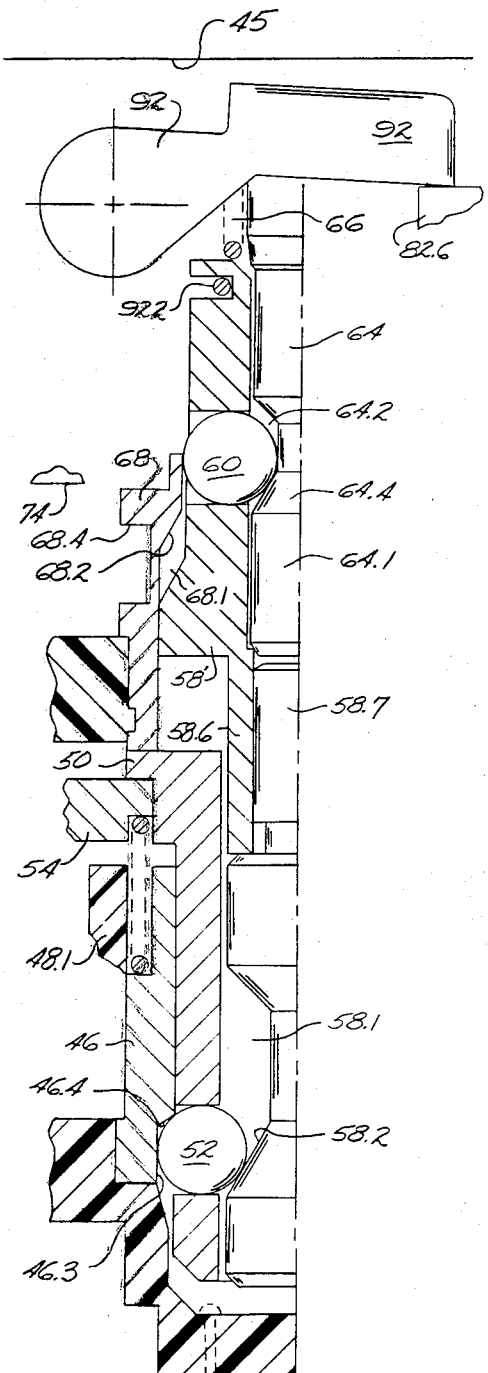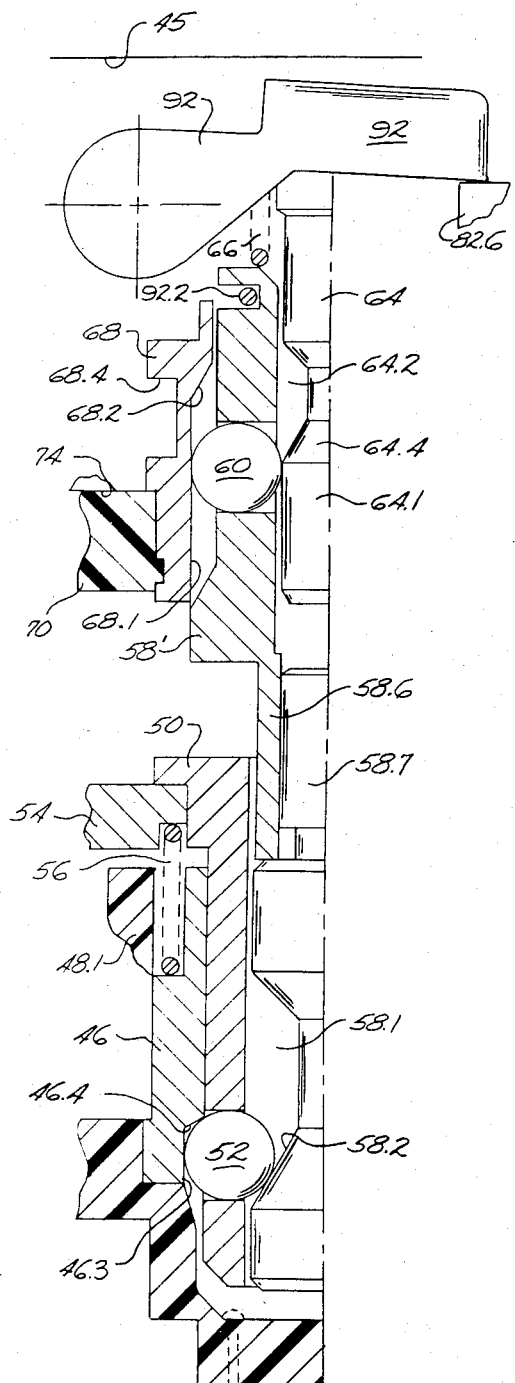
Fig.18c — LATCHED — STRIKER PLATE DOWN
Fig.18d — LATCHED READY TO TRIP

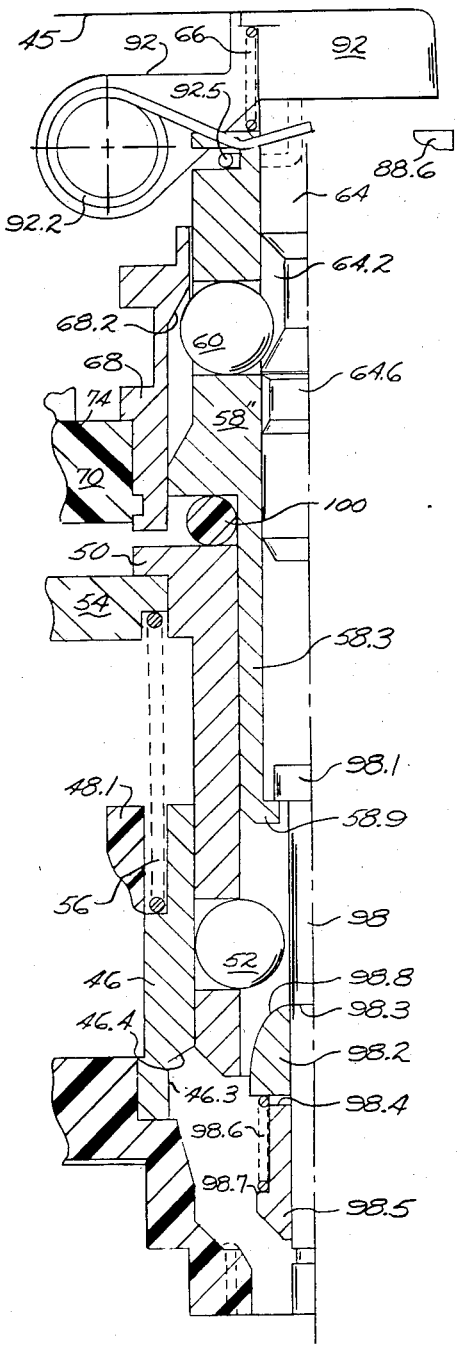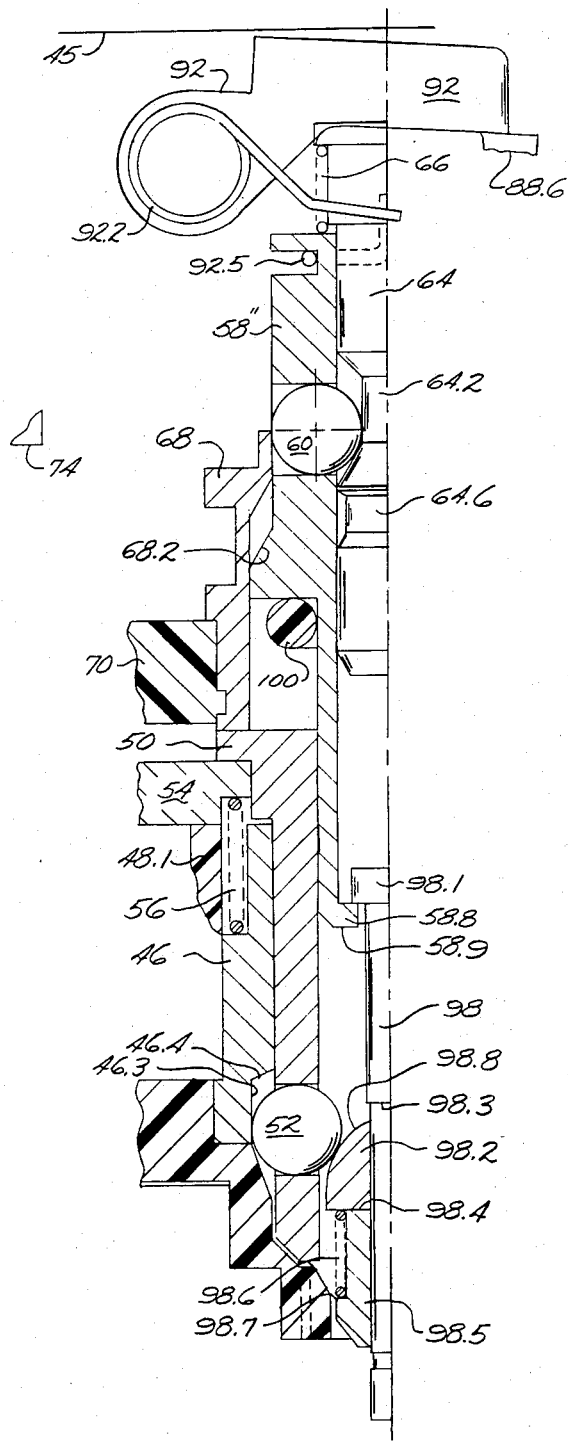
READY TO RESET
FULL RESET STROKE
Fig.19a
Fig.19b

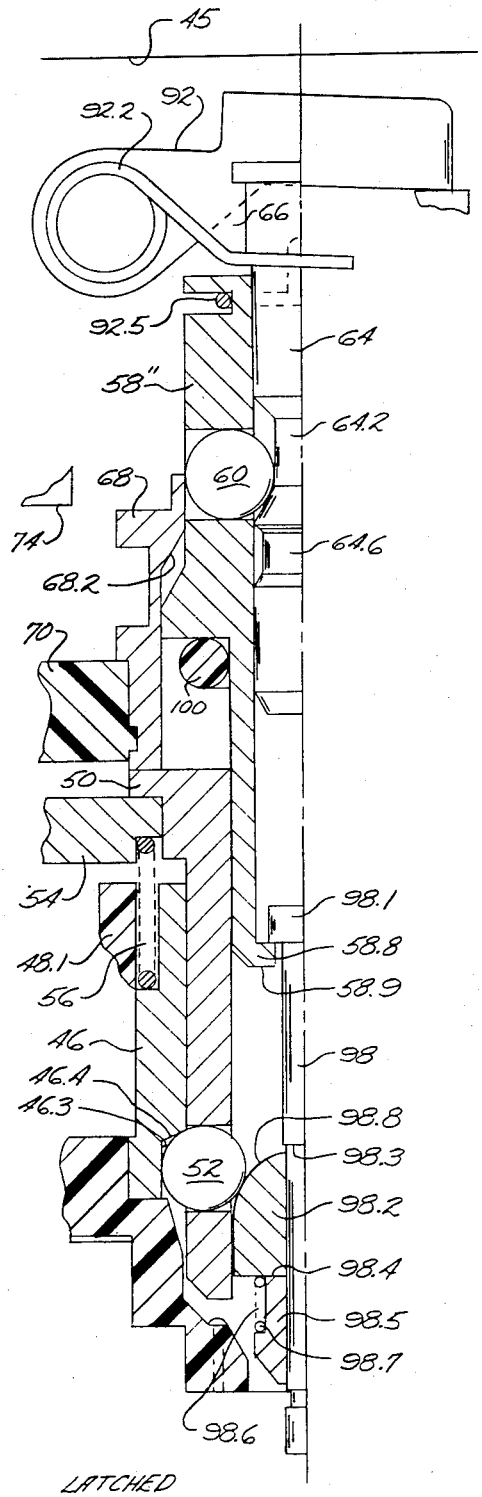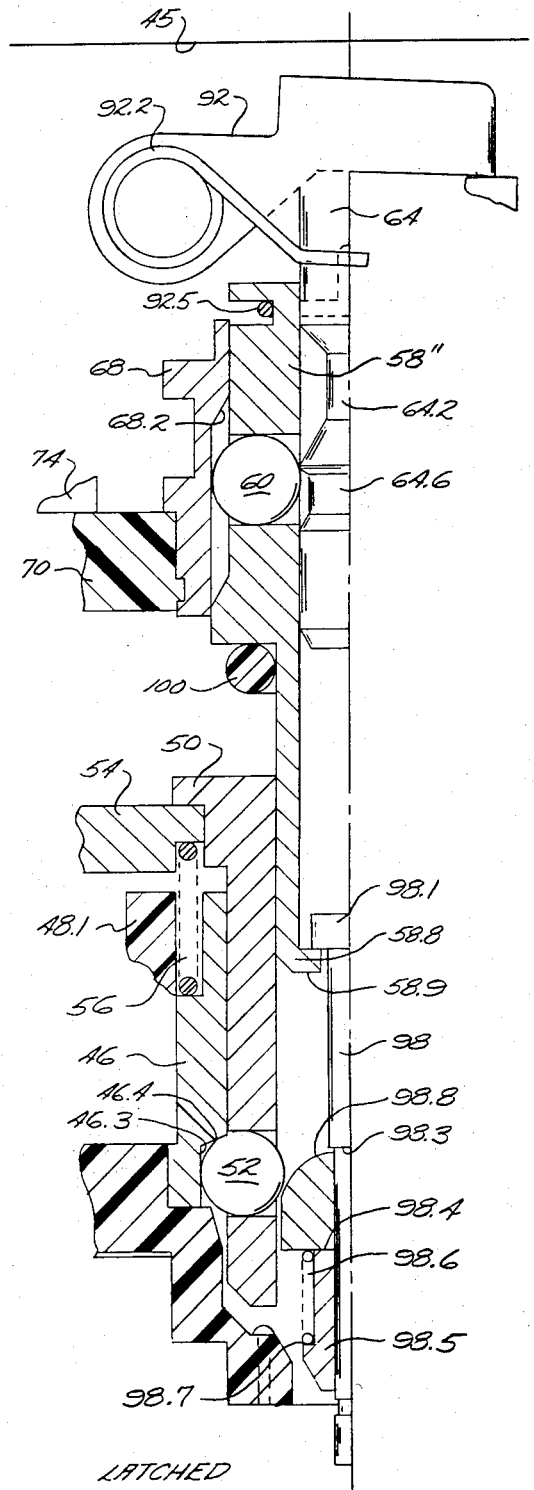
Fig.19c — LATCHED STRIKER PLATE DOWN
Fig.19d — LATCHED READY TO TRIP

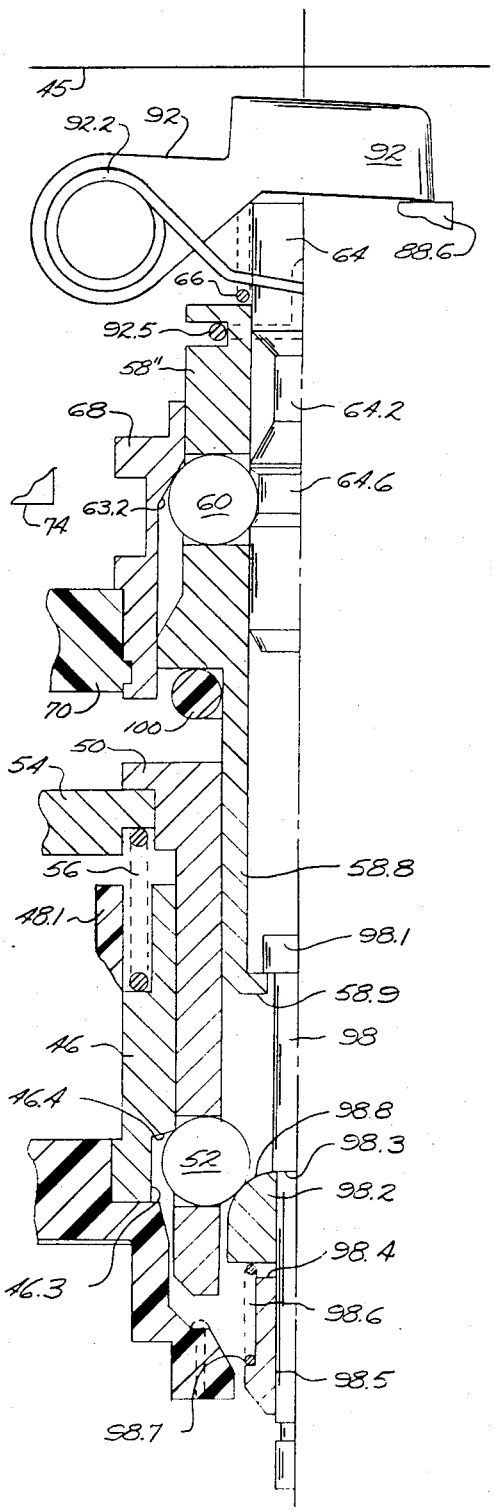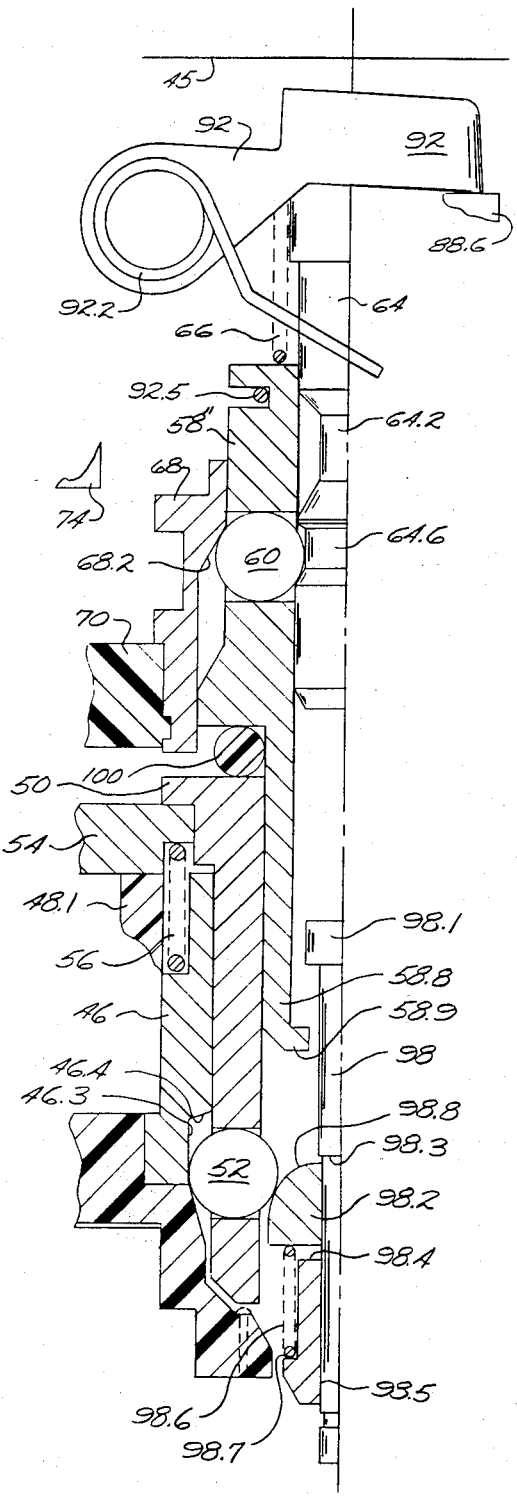
Fig.19e — INTERMEDIATE TRIP POSITION
Fig.19f — FULL TRIP POSITION

CIRCUIT CONTROL DEVICE

CROSS REFERENCE TO RELATED APPLICATIONS

The disclosure herein is also included in U.S. Pat. applications Ser. No. 395,167, in the names of Aime J. Grenier and Lyle E. McBride; Ser. No. 395,174, in the names of Aime J. Grenier and Robert W. Peterson; Ser. No. 395,169 in the name of Aime J. Grenier and Robert J. Bowen; Ser. No. 395,532 in the names of Aime J. Grenier and Hans G. Hirsbrunner; Ser. No. 395,168, in the names of Robert W. Peterson, Aime J. Grenier, and Odd Larsen; and Ser. No. 395,535, in the names of Aime J. Grenier, Robert W. Peterson, and Hans G. Hirsbrunner; all filed on July 6, 1982 and assigned to the assignee hereof.

BACKGROUND OF THE INVENTION

1. Field of the Invention

This invention relates to circuit control systems and more particularly to remotely operated circuit control systems.

2. Description of the Prior Art

In modern aircraft in order to reduce the weight and cost of heavy, expensive aviation cable between power supply busses and electric loads via the flight engineer's or pilot's station, it is known to use remotely controlled circuit devices such as remotely controlled circuit breakers located near the power supply with small control units positioned in the cockpit and interconnected with the breaker itself by light, inexpensive control wires in order to reduce the length of power lead runs between the power bus equipment and the loads. These remote control breakers function to protect against overloads (both of the short-circuit and low level or ultimate trip types), as well as contactors which are resettable and trippable from the control unit.

One such remote controlled circuit breaker is described and clained in U.S. Pat. No. 3,651,436 which issued to Lawrence E. Cooper and Robert W. Peterson and is assigned to the assignee of the instant invention. While that circuit breaker has been very effective and reliable, assembly is more complex and time consuming than desirable thereby adding to the cost of the device. Further, there is a continuing need to decrease the size and weight of such circuit breakers and to increase their life expectancy. Another example is described and claimed in U.S. Pat. No. 4,317,094 in which a solenoid and pawl arrangement can be used with conventional circuit breakers to make them remotely controllable. The applicability of this latter example is however, somewhat limited since the force levels required for lower current ratings due to the size limitations imposed by the airplane structure. That is, if it were to be used at current levels of up to 75 amperes for example, the size of the solenoid required would be larger than acceptable.

SUMMARY OF THE INVENTION

Among the several objects of the invention may be noted the provision of improved remotely controlled circuit control devices which permit substantial economies in the reduction of cable weight and expense; the provision of such devices in which power switching, overload sensing and protection functions are provided in one unit located in a position close to the power source and the load being supplied and protected, while even smaller control units are positioned in the strategic and spatially limited area of the cockpit or flight engineer's console, there to provide the control and to indicate contact status conditions; the provision of circuit control devices of the type described which have improved rupture capacity as well as having increased reliability and longer life expectancy, yet are of reduced size and weight compared to prior art devices; the provision of circuit control devices of the type described which have a minimum number of adjustments or calibration steps required during assembly and which, in general, are more conducive to low cost assembly techniques, the provision of circuit control devices which combine contactor and breaker functions in one package, protect against all types of overloads and are inherently trip-free and the provision of such circuit control devices which can be used without discrimination with a-c or d-c power within prescribed ranges.

Briefly, a remote controlled circuit control device of this invention includes first and second load contact assemblies which are movable relative to one another into a circuit engagement position and a circuit disengagement position on alternate forward strokes of a single solenoid acting through a push-push mechanism. The push-push mechanism is operatively connected to one of the load contact assemblies and a latch mechanism cooperates with the push-push mechanism to maintain the load contacts in the circuit engaged position when the push-push mechanism is reset and a thermal overload mechanism is operatively connected to the latch mechanism and is adapted to unlatch the load contacts up occurrence of an overload condition. The push-push mechanism is mechanically coupled to several switches in such a manner that actuation of the switches is dependent upon the position of the said one of the load contact assemblies. One of these switches is a mode switch which relates the position of the load contacts to the logic circuit so that a solenoid drive pulse signal will enter a solenoid drive circuit only in the correct sequence. When the breaker is closed (load contacts engaged) the pulse signal is allowed only in a trip circuit and when the breaker is open (load contacts disengaged) the pulse signal is allowed only in the reset circuit. Another switch is an overload trip switch which is used to provide contact status feedback and coordination between the load contacts and the contacts of an indicator-control unit (ICU). A third switch may be included to indicate contact status by actuating other signal devices such as a pilot light or buzzer or to interface with other control circuits as may be desired. The device includes a trip free feature in which the contact assemblies are maintained out of electrical engagement for the duration of the energization of the solenoid during a reset operation initiated by a manual closing of the ICU. The load contacts close to complete the electrical circuit only on the retraction part of the solenoid stroke cycle after the solenoid excitation pulse is terminated. In order to increase life expectancy the contacts are of the double break variety with contact wiping effected upon movement of the load contact assemblies to the circuit disengaged position. The solenoid is provided with a floating output arm to increase its life expectancy.

The invention accordingly comprises the constructions hereinafter described, the scope of the invention being indicated in the following claims.

BRIEF DESCRIPTION OF THE DRAWINGS

In the accompanying drawings, in which several of various possible embodiments of the invention are illustrated.

FIG. 17 is a plan view of a hybrid-flex circuit including some of the circuit elements shown in FIG. 4 prior to folding and inserting into the housing of the circuit control device;

FIGS. 18a through 18f show a portion of the indexing and latching push-push mechanism in two stable positions (tripped and reset) and four transition positions; and FIGS. 19a through 19f are similar to FIGS. 18a–18f but showing an alternate embodiment.

Corresponding reference characters indicate corresponding parts throughout the view of the drawings.

DESCRIPTION OF THE PREFERRED EMBODIMENTS

Figure 1:
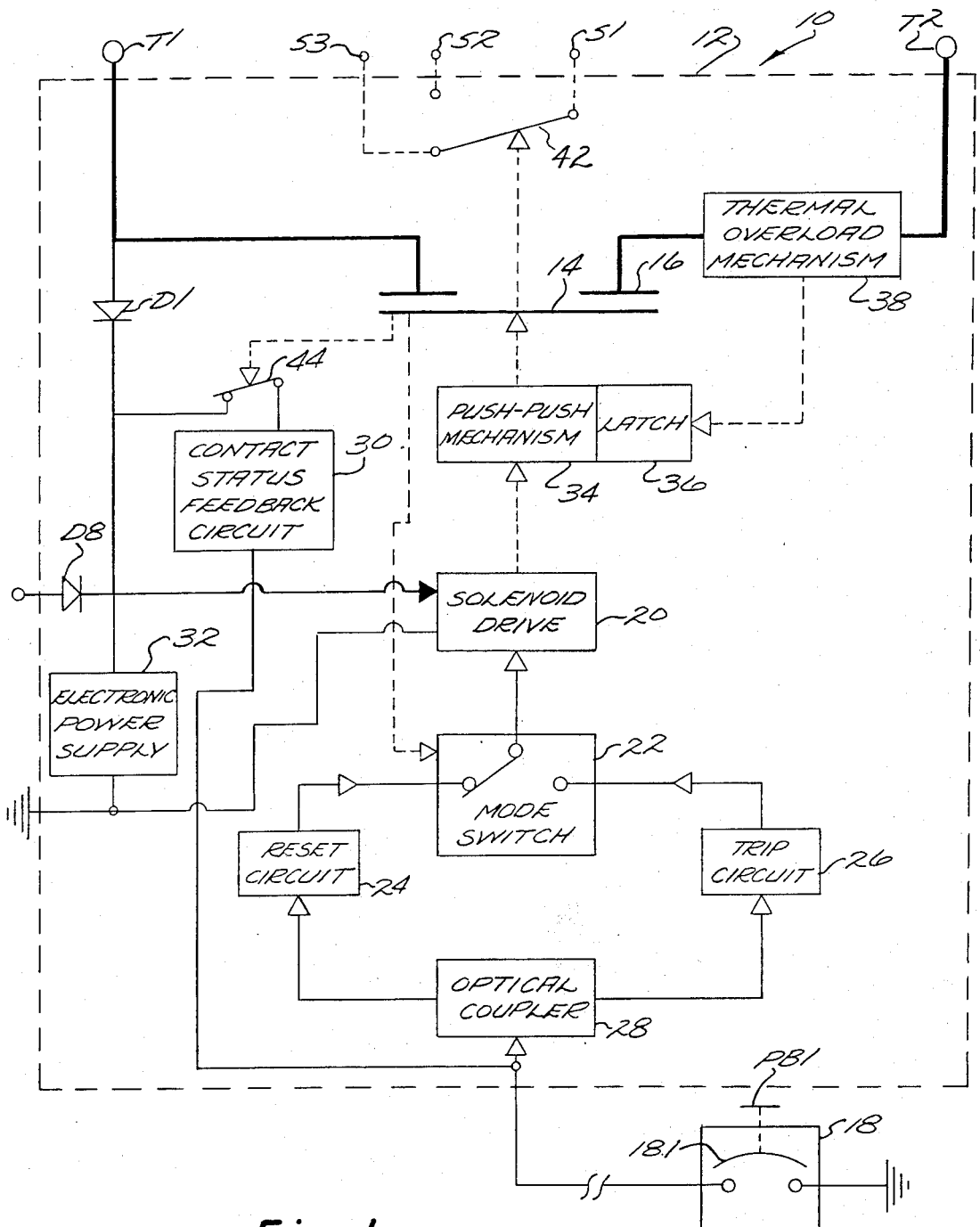
FIG. 1 is an schematic diagram illustrating operational features of a circuit control system made in accordance with the invention.
Figure 2:
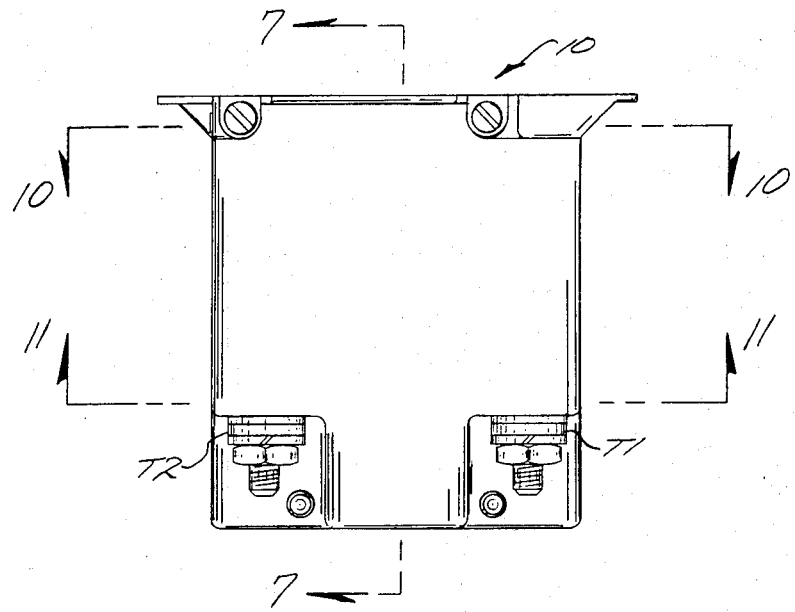
FIG. 2 is a elevational view of a circuit control device made in accordance with the invention and used in the system of FIG. 1.

Referring now to the drawings, FIG. 1 illustrates operational features of a remote circuit control system made in accordance with the invention in which a circuit control device 10, denoted by a dashed line 12 houses first and second load contact assemblies 14 and 16 respectively along with electrical and mechanical means to move the load contact assemblies into circuit engaged and circuit disengaged positions. A remote indicator/control unit (ICU), a circuit breaker 18 of the bimetal thermostatic type is disposed remotely from circuit control device 10, i.e., typically in the cockpit or flight engineer's console of an airplane and is adapted to couple a portion of the circuit control device 10 through connector 3 to ground through the bimetal thermostatic element 18.1 in response to actuation by a actuating button PB1 of the circuit breaker. The electrical means for moving the load contacts between the two positions comprises a solenoid drive 20, a mode switch 22 adapted to connect either reset circuit 24 or trip circuit 26 to solenoid drive 20, an optical coupler 28 coupling the reset and trip circuits to the remote control unit 18, a contact status feedback circuit 30 and an electronic power supply 32.

The mechanical means for moving the load contacts between the two positions include a so called push-push mechanism 34 operatively connected to load contact assembly 14 and adapted to be actuated by solenoid drive 20, a latch mechanism 36 which cooperates with mechanislm 34 to maintain the load contacts in the circuit engaged position when the mechanism is reset, and a thermal overload mechanism 38 which is operatively connected to latch mechanism 36 and is adapted to unlatch the load contacts upon the occurrence of an overload condition. Load contact assembly 14 is mechanically coupled to several switches in such a manner that actuation of the switches is dependent on the position of load contact assembly 14. This mechanical coupling is represented in FIG. 1 by the dashed lines extending from contact assembly 14 to mode switch 22 and overload trip switch 44. In general, the dashed lines in FIG. 1 extending between various components indicate a mechanical coupling, relatively fine solid lines indicate a signal circuit, heavy solid lines indicate the main power circuit and the medium heavy solid lines indicate feedback and drive circuits.

Figure 3:
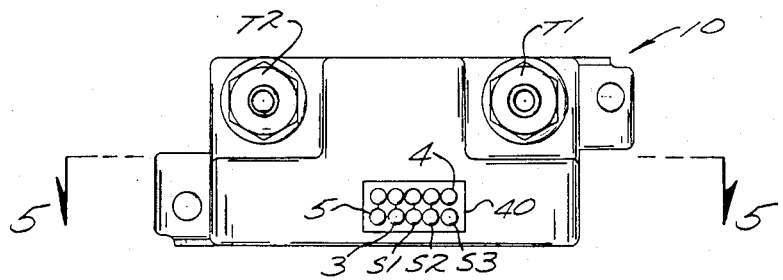
FIG. 3 is a bottom plan view of the FIG. 1 device.

Also noted in FIG. 1 are T1 and T2, the line and load terminals respectively, connector 4 for auxiliary power, rectifying means D1 and D8 and connector 5 for connection to ground. With particular reference to FIG. 3 connector module 40 is shown mounted on the bottom of control device 10 and includes connectors 3, 4, and 5 referred to above as well as S1, S2, and S3 which are connectors for an auxiliary microswitch 42, provided for connection to some external indication circuit provided by the user (i.e., the plane manufacturer). As seen in FIG. 1, S1 represents a common contact connectable between contact S3 when the load contacts are in the contacts disengaged position and contact S2 when the load contacts are in the contacts engaged position. Auxiliary switch 42 is mounted in control device 10 in such a manner that it is actuated each time load contact assembly 14 moves to its contacts engaged position. Mode switch 22 and overload trip switch 44 are also mounted with switch 42 for actuation by load contact assembly 14 as will be explained in detail below.

Figure 4:
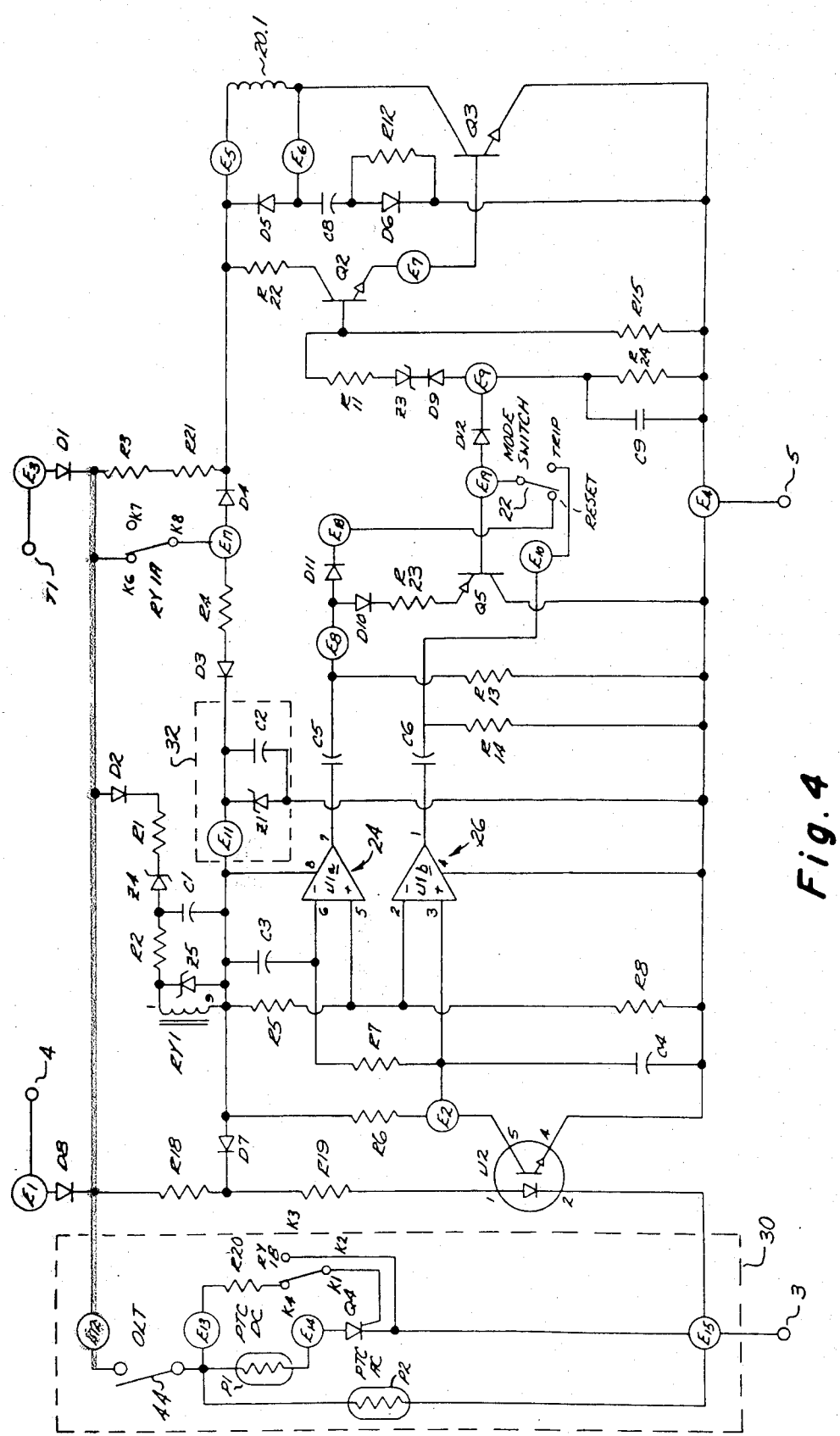
FIG. 4 is an electrical schematic diagram showing the circuitry embodied in the circuit control device of FIGS. 2 and 3.

The electrical means for effecting movement of the load contacts relative to one another and for providing contact coordination is shown in FIG. 4. Points E1–E19 indicate points of connection on a flex-hybrid circuit shown in FIG. 17 to either hybrid circuit components or external connections to the circuit. Control circuit current is drawn from line terminal T1 and passes through rectifying diode D1. Auxiliary or back up control circuit power may be provided at connector 4, the current passing through rectifying diode D8 to point E12. An interface circuit to enable the use of either AC or DC voltage or both includes, in addition to diodes D1, D8, a relay coil of relay RY1, a double pole, double throw relay which is serially connected to point E12 through resistor R2, zener diode Z4, resistor R1, and blocking diode D2. Capacitor C1 is coupled across the relay coil and resistor R2 while a zener diode Z5 is coupled across the coil of relay RY1. Relay RY1 is adapted to be energized by a selected voltage level attainable at the relay coil only when a voltage of sufficient magnitude is supplied at E3 or E1. This sufficiently high voltage level is normally supplied in a-c but not d-c applications so that operation of the relay RY1 is in effect dependent on the type of electrical circuit with which the device is utilized, such as normal levels of 115 volts (alternating) or 28 volts (direct). Ballast resistors R3 and R21, serially connected to one another are connected between point E12 and point E5 with relay contacts K6 and K8 coupled across the ballast resistors. When the coil of relay RY1 is deenergized contact K6 and K8 are in engagement in effect shorting out resistors R3, R21. When the coil of relay RY1 is energized, contacts K8 and K7 move into engagement so that current will flow through ballast resistors R3, R21. Resistor R4 is connected between the relay contacts K6, K8 and a power supply circuit 32 with diode D4 blocking current flow through resistor R4 from resistors R3, R21. Diode D3 blocks current flow through resistor R4 from circuit elements connected at E-11.

Electronic power supply 32 provides a selected DC level for the logic portion of the circuit including reset circuit 24 and trip circuit 26 and comprises zener diode Z1 connected in parallel with capacitor C2 between point E11 and ground at connector 5 (point E4).

The reset and trip circuits 24 and 26 comprise a dual comparator circuit U1 which has a direct voltage level provided by power supply 32 between pins 8 and 4 respectively of reset operational amplifier U1a and trip operational amplifier U1b. A voltage divider circuit comprising resistors R5 and R8 is connected between the output of the power supply 32 and ground to provide a reference voltage to the input pin 2 of amplifier U1b and the input pin 5 of amplifier U1a. An RC timing delay network comprises capacitor C3 connected between the paper supply output and the input pin 6 of amplifier U1a and resistor R7 connected between pin 6 and point E2 to be discussed below. Another timing delay network comprises capacitor C4 and resistor R6. Capacitor C4 is connected between input pin 3 of amplifier U1b and ground while resistor R6 is connected between point E2 and the output of power supply 32.

Point E2 is connected through pin 5 of optical coupler U2 to the collector of the coupler's light responsive transistor, the emitter of which is connected to ground through pin 4. The optical coupler's light emitting diode is connected through pin 2 to connector 3 (and thus to the ICU) and through pin 1 to resistor R19. The light emitting diode may draw current through either diode D7 from E11 or through resistors R18 and R19 from E-12.

The output pin 7 of amplifier U1a is connected to another RC timing circuit comprising capacitor C5 and resistor R13 which in turn is connected to ground. The junction between capacitor C5 and resistor R13, point E8 is connected to doide D11 which in turn is connected to the normally closed (ready to reset position) contact of mode switch 22. Intermediate point E8 and diode D11 a charge enhancing circuit is disposed comprising diode D10 connected to resistor R23 which in turn in connected to the emitter of PNP transistor Q5 whose collector is connected to ground. The base of transistor Q5 is connected to point E19, the common terminal of mode switch 22.

Output pin 1 of comparator U1b is connected to RC timing circuit comprising capacitor C6 and resistor R14 which in turn is connected to ground. The junction of capacitor C6 and resistor R14, point E10 is connected to the normally open (ready to trip position) contact of mode switch 22.

The common terminal of mode switch 22 is connected through diode D12 at point E9 to an RC pulse extender circuit comprising capacitor C9 and parallel connected resistor R24, both connected to ground. Point E9 is serially connected to blocking diode D9, zener diode Z3, resistor R11 and the base of NPN transistor Q2, the first of a two stage amplifier pair of transistors Q2, Q3. Resistor R15 is placed between the base of transistor Q2 and ground while resistor R22 is placed between the collector of transistor Q2 and point E5. The emitter of transistor Q2 is coupled to the base of NPN power transistor Q3 whose emitter is connected to ground and whose collector is connected to solenoid 20.1. Diode D5 is coupled across solenoid 20.1 to dissipate back EMF and to reduce stress on power transistor Q3 during the shut off period. This diode also services to maintain current flow through the solenoid during an operation on 400 Hz half wave excitation for the half of each cycle in which diode D1 blocks. The energy stored in the magnetic field of the solenoid is thus used to extend current flow during the off part of each cycle and reduce the force fluctuations in the solenoid output. A snubber circuit for transistor Q3 comprises capacitor C8 connected on one side to diode D5 and on the other to diode D6 which in turn is connected to ground with resistor R12 coupled across diode D6.

Contact status feedback circuit 30 extends between rectifiers D8, D1 and point E15 which is connectable to the indicator control unit 18 disposed in the cockpit which in turn is connectable to ground through thermal element 18.1.

This circuit path comprises overload trip switch 44 which is in turn connected to first and second parallel connected branch circuits. The first branch comprises a positive temperature coefficient (PTC) element P1 connected between switch 44 (point E13) and a main electrode of an SCR Q4 whose gate is connected to the common terminal K2 of relay contacts RY1B which are controlled by the coil of relay RY1. Contact K4 of relay contacts RY1B is connected through biasing resistor R20 to point E13. Contact K3 is connected to the other main electrode of SCR Q4. The second branch circuit comprises a second positive temperature resistor (PTC) element P2 connected between switch 44 and point E15. Both PTC elements are chosen to have the same anomaly temperature (in the preferred embodiment 130° C.) and are mounted so that they are thermally coupled to one another. Current flow through the parallel path including resistors R18 and R19 is trivial and insufficient to cause ICU unit 18 to trip. When the overload trip switch 44 is closed, current flow through the path including PTC elements P1 and P2 is sufficient to cause the bimetallic element in a closed ICU 18 to heat causing ICU 18 to trip, opening the circuit to ground. In the event that ICU unit 18 fails to open for any reason the PTC elements serve to limit the current flow through the line leading to the unit 18 thereby protecting the line from overcurrent and the power source from a continuous current drain.

Relay contacts K2–K4 of RY1B and K6–K8 of RY1A are shown in the deenergized condition of the coil of relay RY1 which condition exists when there is an absence of a sufficient voltage level required for such energization as occurs in the d-c operating mode.

The interface circuit is adapted to provide both the required drive power for the solenoid 20.1 as well as the selected level of direct voltage for the logic portion of the circuit for any level of input power at terminal T1 and connector 4 between 18 to 32 volts DC and 104 to 132 volts AC.

For an explanation of the operation of the circuitry it should be noted that there are two stable conditions of the load contacts of circuit control device 10, viz., the load contacts engaged, reset position, and the load contacts disengaged, tripped position. As will be explained in greater detail below in describing the various mechanical and electromechanical components and operation of the device when the load contacts are in the engaged, reset position the overload trip switch 44 is open and the mode switch 22 is in the ready to trip position and when the load contacts are in the disengaged, tripped position the overload trip switch 44 is closed and the mode switch 22 is in the ready to reset position.

With regard to the contactor function, starting with the load contacts in the disengaged, tripped position when the pilot or other operator wants to energize the load he closes ICU 18 by pushing button PB1. In the preferred embodiment ICU 18 is a small half-ampere rated circuit breaker, uncompensated for ambient thermal conditions. When ICU 18 is closed it provides a path to ground from terminal T1 and connector 4 through resistors R18, R19 and the light emitting diode of optical coupler U2. The transistor of coupler U2 then turns on and brings point E2 to ground. Capacitor C3 charges through resistor R7, and when the voltage at pin 6 of amplifier U1a drops below the reference voltage at pin 5, output pin 7 goes to a high voltage state, approximately equal to the power supply output voltage at E11. This high voltage also occurs at point E8 but decays as capacitor C5 charges as current flows through C5, R13 and the parallel network connected at E-19 and, once the mode switch opens, through transistor Q5 which turns on when the mode switch opens. Since the mode switch is in the ready to reset position, the pulse passes on to zener diode Z3. Diode Z3 helps to chop off the long decay tail of the pulse which would cause undesirable operation of transistors Q2 and Q3 in a high loss area. If the voltage level is above an amount determined by diode Z3 selected to avoid nuisance tripping due to noise and the like, transistor Q2 will be turned on for the duration of the pulse which in turn turns on transistor Q3 and allows current to pass through solenoid 20.1 from ballast resistors R3, R21 if the main power supply is a-c or through contacts K6, K8 of relay contacts RY1A if the main power supply is d-c. At the cessation of the pulse Q3 is turned off thereby deenergizing solenoid 20.1. The duration of the pulse is selected so that solenoid 20.1 is energized long enough to cause the load contacts to move to the contacts reset or engaged position after the mode switch opens as will be explained in greater detail below. In order to ensure that the pulse is of sufficient duration at low excitation voltages the pulse extender RC network of resistor R24, capacitor C9 is provided. This extends the pulse for a few milliseconds subsequent to the transfer of the mode switch to ensure that the solenoid continues to drive through to the end of the stroke. At higher excitation voltages this is not necessary since momentum carries the mechanism through at the higher solenoid drive levels.

With the load contacts now in the reset, engaged position the mode switch 22 is in the ready to trip position and trip switch 44 is open. This entire sequence takes approximately 70 milliseconds to complete.

When the operator wishes to disengage the load contacts he pulls up on push button PB1 and opens the circuit through the light emitting diode of optical coupler U2 which deenergizes the light emitting diode and turns off the coupler's transistor. Capacitor C4 charging now occurs through resistor R6, and when voltage at pin 3 of amplifier U1b exceeds the referenced voltage at pin 2 of the comparator the output pin 1 goes to a high voltage state, approximately equal to the power supply output of E-11. This high voltage also occurs at point E10 but decays as capacitor C6 charges as current flows through C6, R14 and the parallel network connected at E19. Since the mode switch is now in the ready to trip position the pulse is passed on to the amplifier pair of transistors Q2, Q3 to energize solenoid 20.1 for the selected pulse duration to move the load contacts mechanism back into the tripped, disengaged position. When the load contacts move to the disengaged position, overload trip switch 44 closes, however no current passes through PTC elements P1 or P2 since the contacts of ICU 18 are open.

With regard to the circuit breaker function when an overcurrent occurs, a latch maintaining the load contacts in engagement releases and allows a contact return spring, to be described infra, to move the load contacts to a disengaged position causing overload trip switch 44 to close and the mode switch 22 to move to the ready to reset position. Current flows through switch 44 into one or both PTC elements P1, P2 depending on whether relay RY1 is energized or not. In either case ICU 18 is subjected to additional current which quickly causes thermostat element 18.1 to heat, tripping and opening the ICU unit 18 and the path to ground thereby coordinating the status of the ICU 18 contacts with the load contacts and giving visual indication through the position of pushbutton PB1. This also deenergizes optical coupler U2 and cuses point E2 to go to a relatively high voltage level. The outputs of the two operational amplifiers then "flip-flop" with U1a's going low and U1b's going high. However the pulse generated in the ready to trip circuit is not passed to the solenoid drive circuit since the mode switch 22 has opened the link. There is no switching pulse generated in the ready to reset circuit since capacitor C5 is discharged to ground through U1a and in fact, point E-8 is temporarily even more negative.

If ICU 18 should be closed by an operator while a fault condition exists, the breaker will transfer to the latching position, the mode switch will transfer and the load contacts will then engage on the retraction stroke of the solenoid. The overload circuit will cause the breaker to unlatch and the load contacts to disengage within a few milliseconds after the contacts engage on the fault if a short circuit condition exists or within a longer period for lower levels of overload current according to the required time-current values specified.

MISSING PAGE TEMPORARY NOTICE

PATENT # 4502033   FOR ISSUE DATE 2-26-85

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 9, 10

Figure 13:
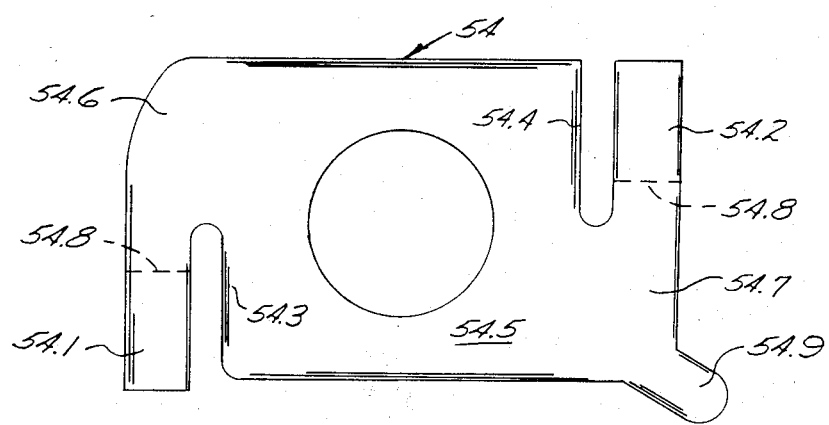
FIG. 13 is a top plan view of the movable contact bridge plate used in the circuit control device.

Contact plate 54, see in particular FIG. 13, is generally rectangular in top plan view and is configured to orient the contact surfaces so that they will be in alignment with the contact surfaces of pivotable contact members 76. To that end first and second legs 54.1 and 54.2 extend along two opposite sides 54.3, 54.4 of a main body portion 54.5 and are joined to body portion 54.5 at two diametrically opposed corners 54.6 and 54.7 respectively. Electrical load contacts 54.8 of suitable contact material, such as a silver, tin oxide and indium oxide, are mounted at the distal free end of legs 54.1 and 54.2. It will also be noted that a tab 54.9 projects out from the main body portion 54.5 which is slidably received in a vertically extending groove 48.4 formed in base 48 in order to maintain the proper orientation of contact plate 54 so that contacts 54.8 mate with contacts 76.5 of pivotable contact members 76.

Figure 14:
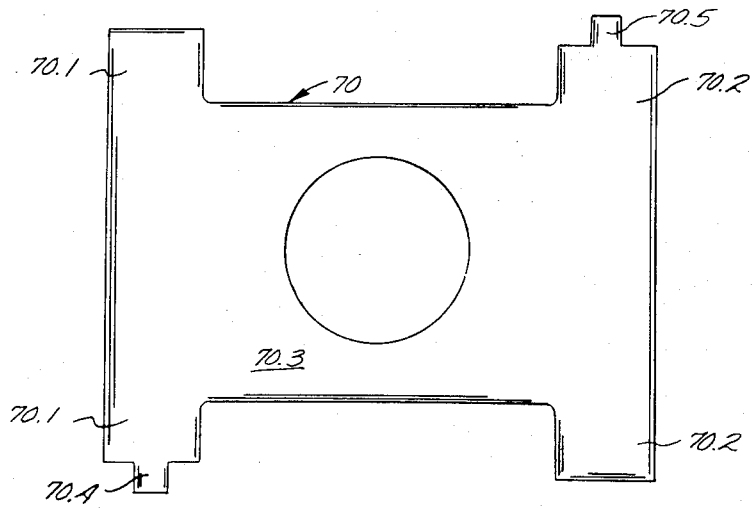
FIG. 14 is a top plan view of a striker plate used in the circuit control device.
Figure 15:
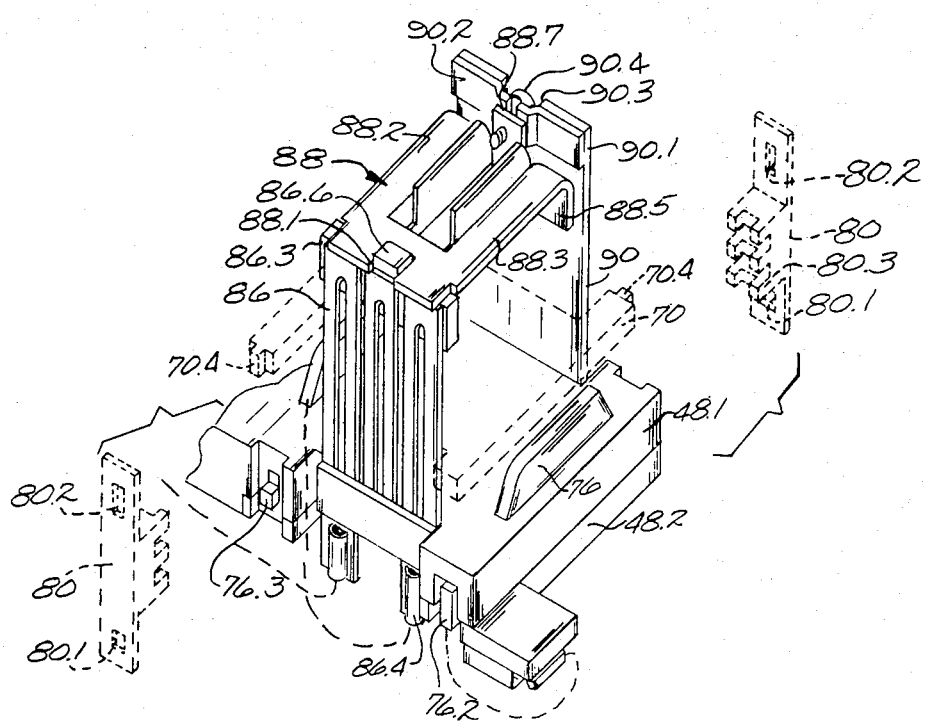
FIG. 15 is a perspective view of the overload trip mechanism used in the circuit control device.

Striker plate 70, shown in plan view in FIG. 14, is configured generally as a rectangle with legs 70.1 and 70.2 extending beyond the main body portion 70.3. A tab 70.4 projects outwardly from one end face of leg 70.1 while a similar tab 70.5 projects outwardly from the oppositely disposed end face of leg 70.2.

Figure 9:
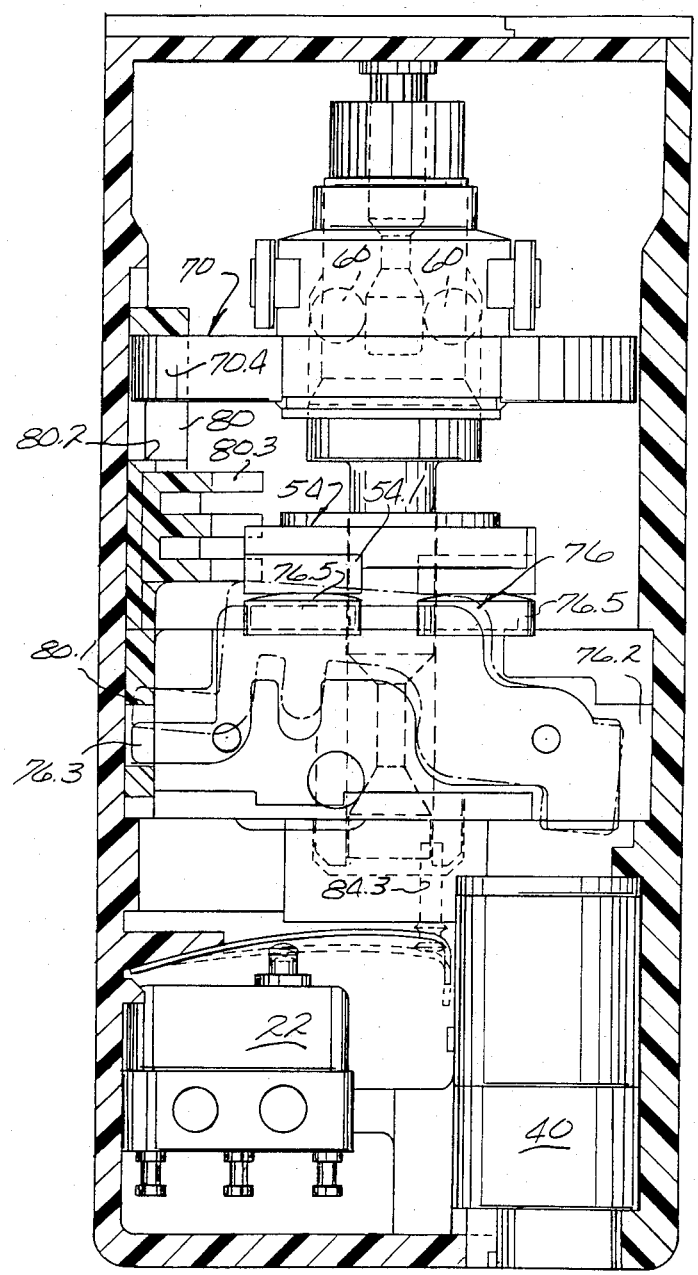
FIG. 9 is a vertical cross section somewhat similar to FIG. 7 but highlighting details of the pivotably mounted contact assembly and showing an alternative mount for the microswitch actuator strip.

A link 80 formed of suitable electrically insulative material such as that used for base 48 operatively connects striker plate 70 and pivotable contact members 76. As seen in FIG. 9, link 80 is an elongated bar shaped element having an aperture 80.1 on its lower end into which toe 76.3 of the pivotable contact member projects. At its upper end link 80 is formed with an elongated lost motion slot 80.2 into which tab 70.4 or 70.5 of striker plate 70 extends. As seen in FIG. 9, when striker plate 70 moves downwardly once it hits the bottom surface defining slot 80.2 of link 80 continued downward motion causes counterclockwise pivotal movement of contact member 76.

Figure 5:
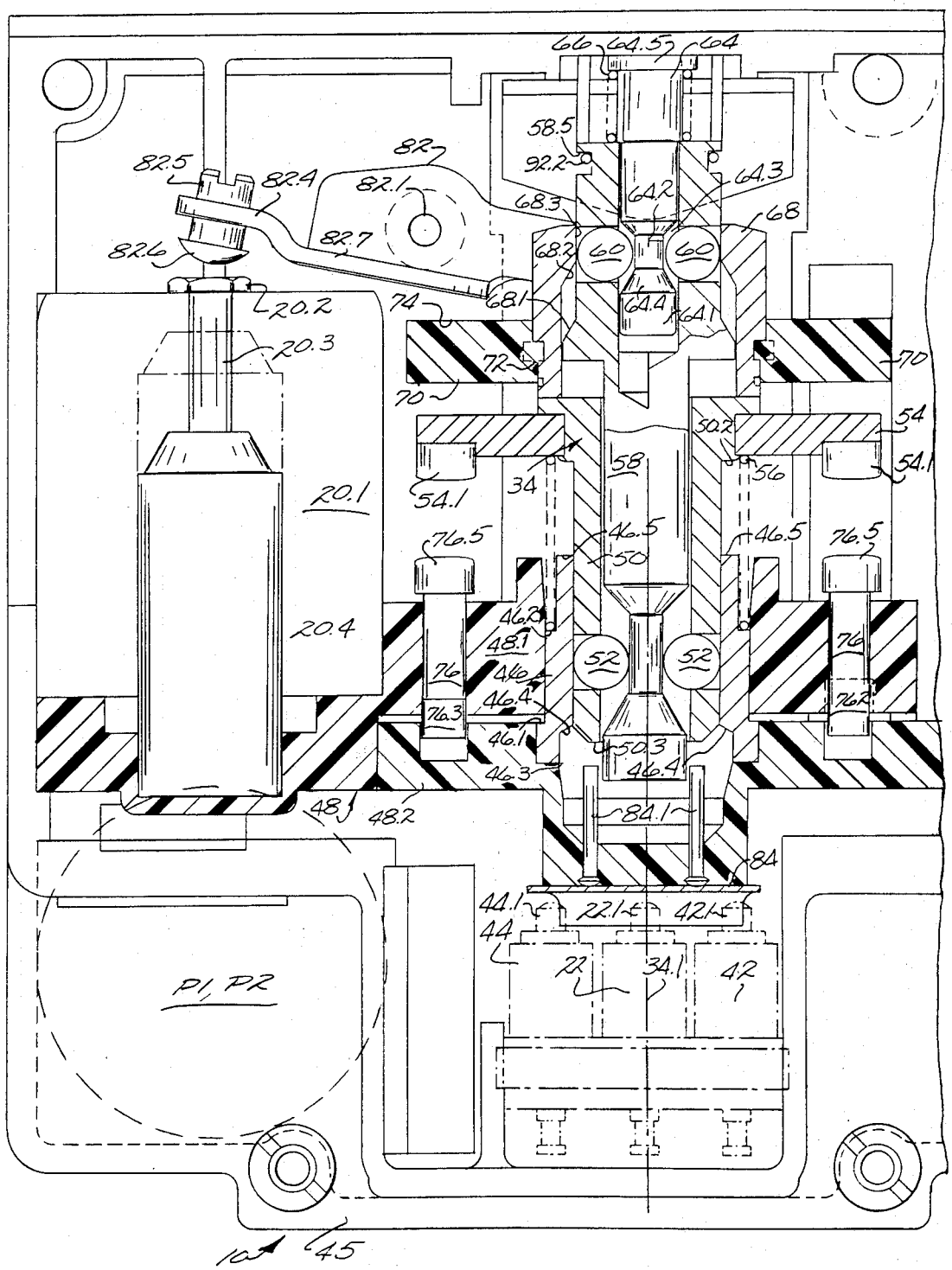
FIG. 5 is a vertical cross section taken on line 5—5 of FIG. 3 showing the circuit control device in the contacts tripped, disengaged position.
Figure 6:
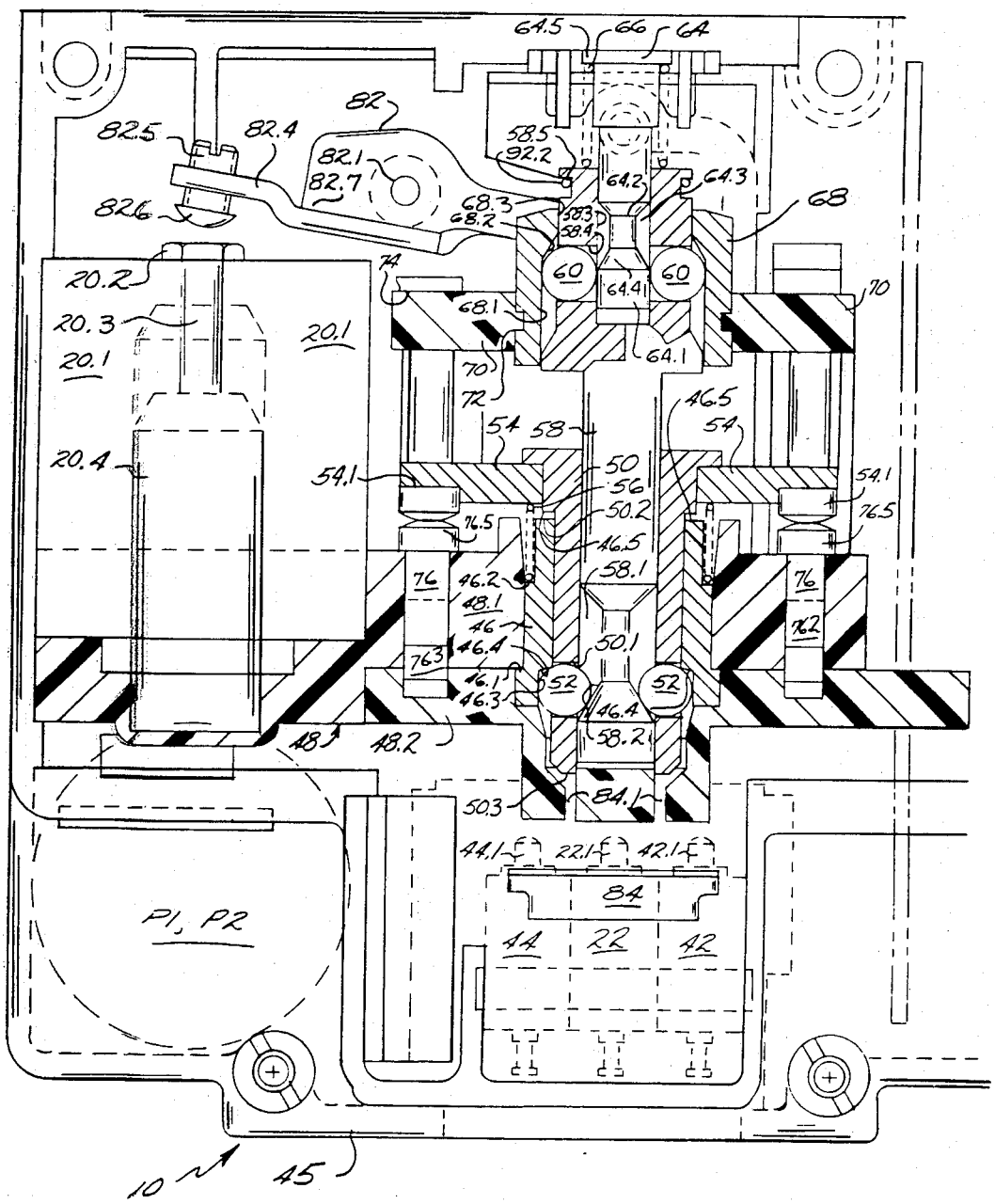
FIG. 6 is a view similar to FIG. 5 but showing the device in the contacts reset engaged position.

As seen in FIGS. 5 and 6, downward movement of contact bridge plate carrier 50 is limited by shoulder 50.2 of carrier 50 contacting the top distal face portion 46.5 of stationary sleeve 46. As will be explained in greater detail below, when trip/reset cap member 68 is caused to stroke downwardly carrying striker plate 70 along with it, it causes pivotable contact members 76 to pivot downwardly preventing circuit engagement of contacts 54.1, 54.2 of contact bridge member 54 with respective contacts 76.5, 76.5 of contact members 76 until striker plate 70 starts to move upwardly in the lost motion slot 80.2 thereby allowing contact members 76 to pivot clockwise under the influence of springs 78 into circuit engagement of movable contacts 54.1, 54.2 with respective pivotable contacts 76.5 and 76.5, with the contact bridge plate 50 latched in its lower position as will be explained below.

Upon unlatching of contact bridge plate 50 upward movement results in contact wiping motion due to the pivoting motion of contact members 76 to help keep the contact surfaces clean.

Link member 80 is formed with an arc extinguishing grid 80.3 disposed intermediate slots 80.1 and 80.2 so that the arc grid will be adjacent the contacts upon circuit engagement and disengagement.

Figure 7:
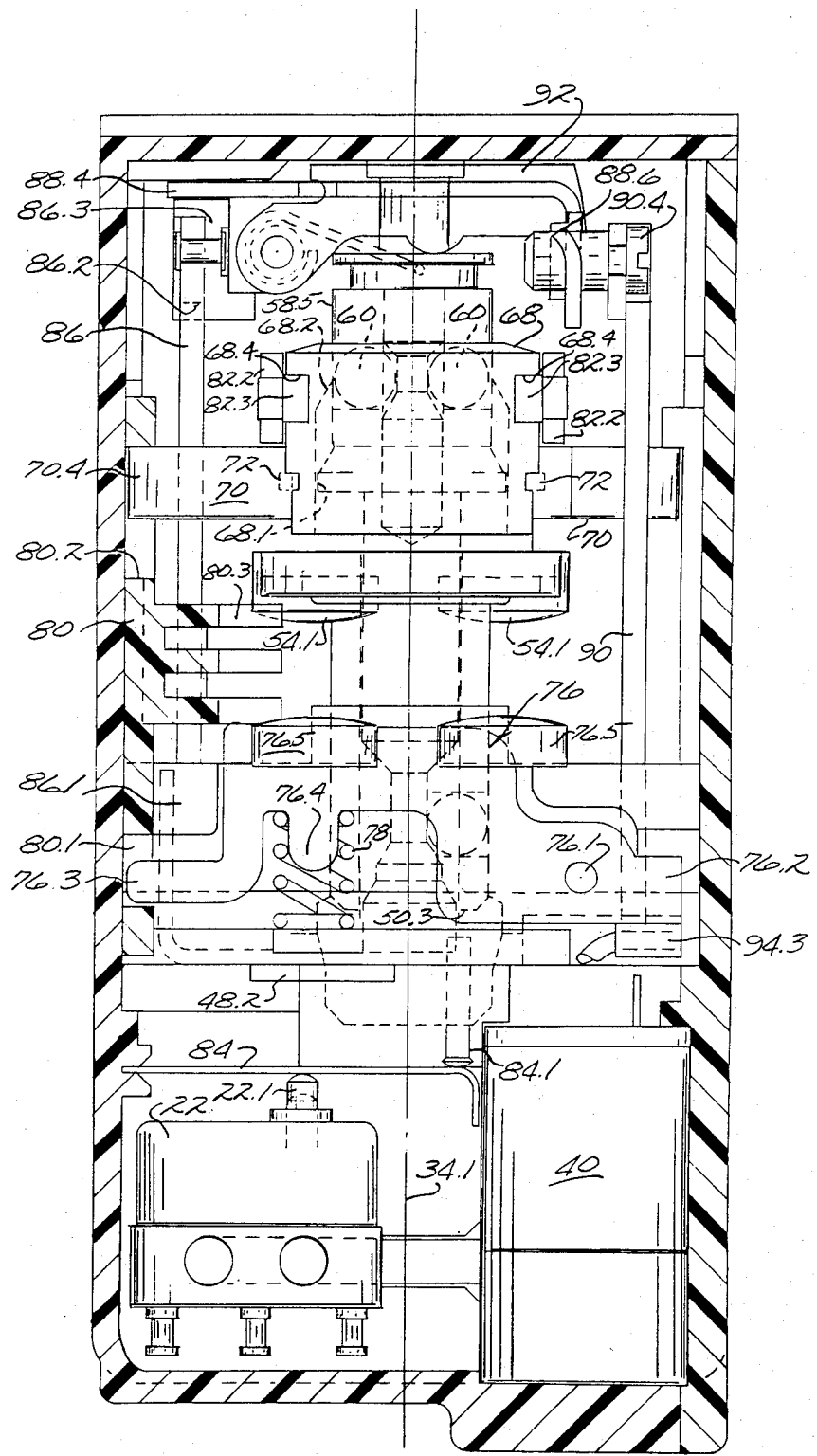
FIG. 7 is a vertical cross section taken on line 7—7 of FIG. 2 showing the circuit control device in the contracts tripped disengaged position and highlighting details of the overload trip mechanism.
Figure 8:
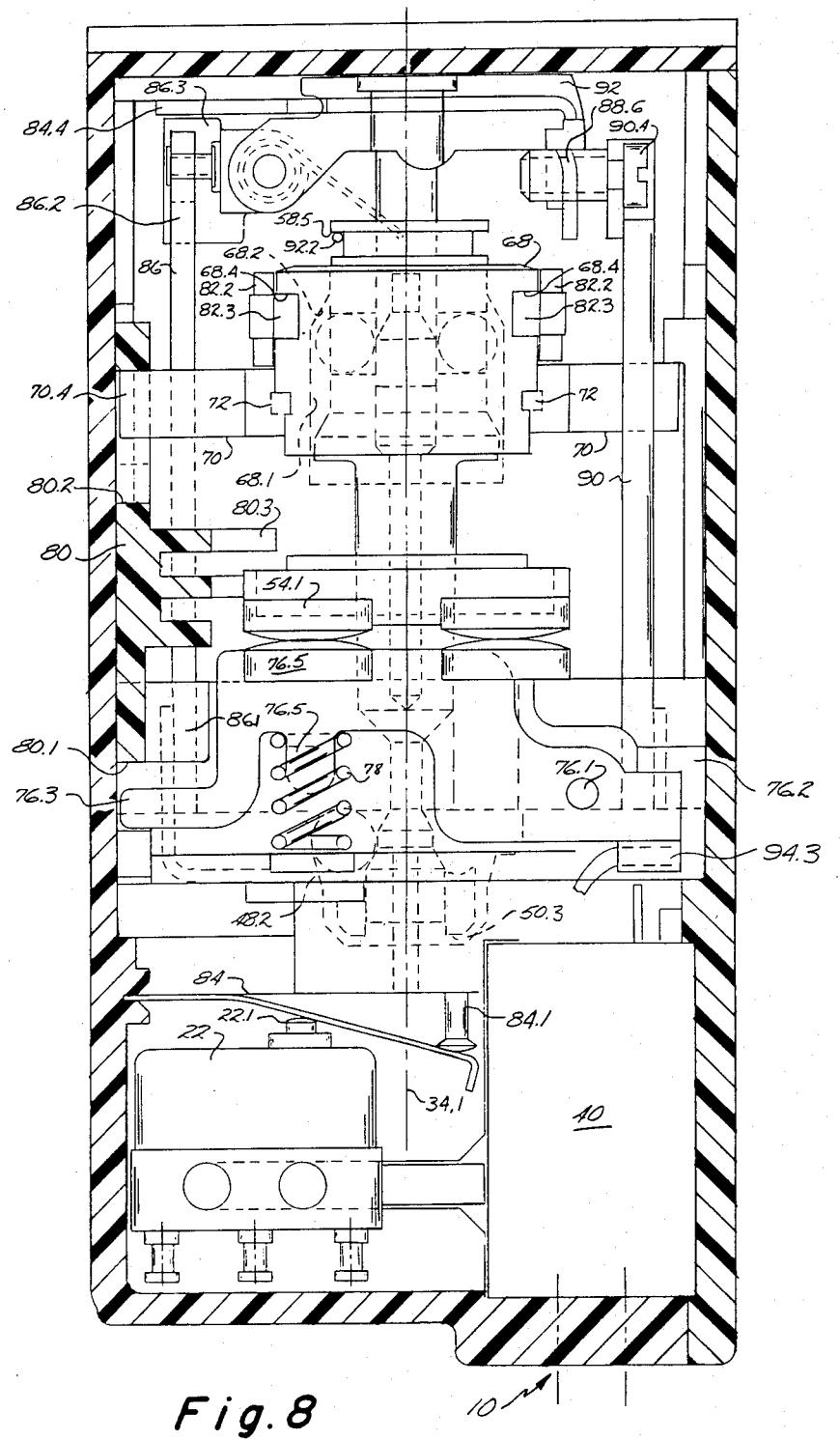
FIG. 8 is a view similar to FIG. 7 but showing the device in the contacts reset, engaged position.
Figure 10:
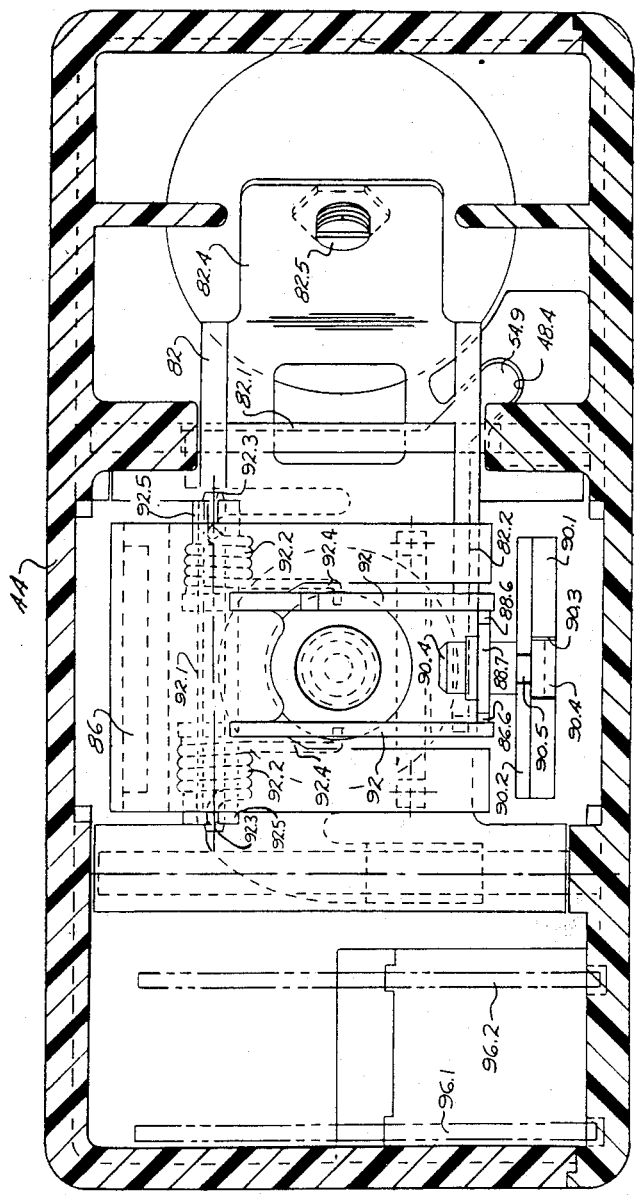
FIG. 10 is a horizontal cross section taken on line 10—10 of FIG. 2 highlighting details of a motion transfer mechanism and the overload trip mechanism.

Trip/reset cap member 68 is formed with a pair of horizontally extending slots 68.4 on two opposite sides of its periphery (FIGS. 7 and 8). Slots 68.4 facilitate connection of a motion transfer mechanism operatively connecting solenoid 20.1 and trip/reset cap member 68. The motion transfer mechanism includes a solenoid lever 82 pivotably mounted on pin 82.1 mounted in the walls of housing 44. Lever 82 is formed with a pair of arms 82.2 (FIGS. 7, 8, and 10) which mount at the free distal end ears 82.3 each of which is adapted to slidingly fit within a respective groove 68.4 of trip/reset cap member 68. On the opposite free end portion 82.4 an axially adjustably mounted member 82.5 having a curved surface portion 82.6 is aligned with a generally flat head 20.2 of an output arm 20.3 of solenoid 20.1. The position of curved surface portion 82.6 can be adjusted relative to the top of solenoid 20.1 to thereby adjust the effective length of the stroke of arm 20.3. This adjustment relates the stroke of the solenoid to the full stroke position of the mechanism during the reset operation. In order to use the available output of the solenoid to full advantage, the lever adjusting screw 82.5 is set so that both the mechanism at full stroke and the core inside the solenoid "bottom out" simultaneously. A solenoid lever spring 82.7 is mounted on pin 82.1 and adapted to react against housing 45 to place a counterclockwise bias on the lever which tends to maintain trip/reset cap 68 in its raised or upper position.

Figure 16:
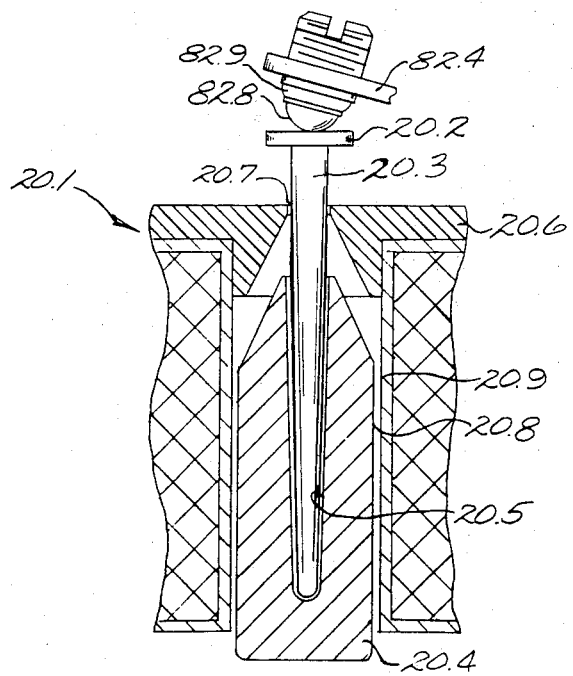
FIG. 16 is a cross sectional view of a solenoid used in the above circuit control device.

The force of spring 82.7 acting through ears 82.3 is sufficiently greater than the force exerted by spring 66 which reacts between index plunger 64 and main plunger 58 to provide a resultant upward bias on trip/reset cap 68. As seen in FIG. 16, the curved surface on the lever adjusting screw can be provided by using a ball bearing 82.8 mounted in a socket 82.9 at the end of solenoid lever 82. With particular reference to FIG. 16 solenoid 20.1 has a core 20.4 having a longitudinally extending bore 20.5 extending essentially the length of core 20.4 but having a closed end. Core extension 20.3 has a diameter selected to be sufficiently smaller than the bore 20.5 that the extension loosely fits therein so that it is free to wobble. Pole piece 20.6 is formed with a bore 20.7 through which core extension 20.3 extends. The wobble motion of core extension 20.3 is limited by the side wall of bore 20.7 which in turn prevents the top portion 20.8 of core 20.4 from stroking the side wall of sleeve 20.9 which would cause gouging, increased friction and shortened life. To further enhance longevity sleeve 20.9, core 20.4 and core extension 20.3 are preferably formed of or coated with materials having low friction and good wear characteristics.

Mounted in housing 45 beneath the central stack of the push-push mechanism 34 are three microswitches referred to above, overload trip switch 44, mode switch 22 and auxiliary switch 42 having, respectively, actuating buttons 44.1, 22.1, and 42.1. A flexible actuator strip 84 is disposed intermediate the switches and the push-push mechanism 34 with one end seated at 45.1 of housing 45 and with an opposite end adapted to engage a pair of actuator pins 84.1 (one is shown in FIG. 9) which are slidably disposed in bores 48.3 of base 48 aligned with the bottom surface 50.3 of contact bridge plate carrier 50 so that when bridge plate carrier 50 is in its lower position the actuating buttons 44.1, 22.1, and 42.1 are depressed by actuator strip 84 which is depressed by carrier 50 through pins 84.1 and when carrier plate is in its upper position the actuating buttons 44.1, 22.1, 42.1 are in their upper position. Thus when contact carrier bridge plate 54 is in its contacts engaged, lower position the switches 44, 22, and 42 are in one state of actuation and when the contact carrier bridge plate 54 is in the contacts disengaged, upper position the switches are in the opposite state of actuation.

With particular reference to FIGS. 7, 8, 10, and 15 the structure providing the overcurrent, circuit breaking function comprises a first active or load current carrying bimetal member 86 having a first end 86.1 anchored in base 48 and extending in an upward direction and having a second end 86.2 attached to a block 86.3 composed of electrically insulative material. Bimetal member 86 is formed from an elongated strip having a first end connected to a crimp terminal 86.4, the strip extending back and forth between base 48 and block 86.3 and terminating at a second end connected to a crimp terminal 86.5. Block 86.3 is formed with a projection 86.6 which is slidingly received in a slot 88.1 at one end surface of latch plate 88. Latch plate 88 end 88.5 is bent downwardly approximately 90° relative to legs 88.2 and 88.3 to form a latch surface 88.6. Preferably that portion of end surface 88.5 contiguous to latch surface forms an angle of slightly less than 90° with the horizontal to ensure a positive release of trip arms disposed on the latch surface as will be explained below. A tab 88.7 projects upwardly from end 88.5 in the middle portion thereof separating latch surface into two portions.

A second passive or ambient temperature compensating bimetal member 90 has one end anchored in base 48 and extends in a direction parallel to that of bimetal member 86 with the push-push mechanism 34 interposed between the two bimetal members 86, 90. At the free distal end 90.1 a bracket 90.2 is attached extending across slot 90.3 and is adapted to mount a calibrating member 90.4. Member 90.4 has a reduced diameter portion 90.5 (see FIG. 10) which extends through a slot in bracket 90.2 and a threaded portion is received in a threaded bore in tab 88.7 so that turning of the member will adjust the position of latching surface 88.6 relative to ambient compensating bimetal 90. A pair of trip arm members 92 are mounted on and keyed to bushings 92.5 which are in turn fixed to pin 92.1 mounted in block 86.3 by soldering and/or interference fits on knurled ends of the pin. A pair of springs 92.2 mounted on bushings 92.5 have one end fixed in a slotted portion 92.3 of bushing 92.5. The other ends 92.4 of springs 92.2 are adapted to be received in the groove 58.5 formed on main plunger 58 and are adapted to place an upward bias on the plunger when the trip arms 92 are maintained in their latched position by latch surfaces 88.6.

Figure 10A:
FIG. 10A is a perspective view of a stirrup element.

Alternatively a generally U-shaped stirrup element 92.5 (see FIG. 10a) may be placed in groove 58.5 defined in plunger 58, element 92.5 having turned over ends 92.6 adapted to capture ends 92.4 of latch springs 92.2.

As ambient temperature changes causing deflection of load current bimetal 86 a corresponding deflection occurs in ambient compensating bimetal member 90 so that there is no motion of latch surfaces 88.6 relative to trip arms 92; however when an overcurrent conditions occurs in the load circuit causing further deflection of load current bimetal 86 it will pull trip arms 92 away from latch surfaces 88.6 until they no longer are maintained in the latched position and plunger 58 is allowed to descend since its upward bias is then removed and there is a positive downward bias from index plunger spring 66 and the reaction of latch balls 52 on latch surface 58.2 of the main plunger.

Figure 11:
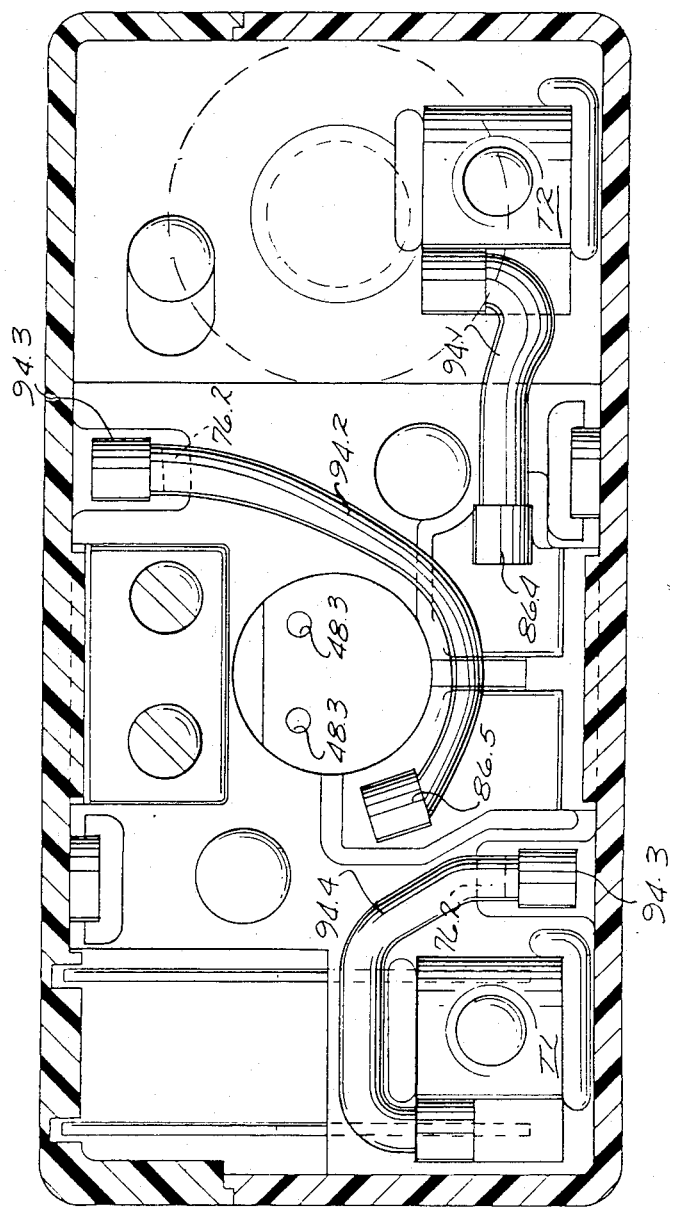
FIG. 11 is a horizontal cross section taken on line 11—11 of FIG. 2 highlighting electrical connections of the internal power circuit.
Figure 12:
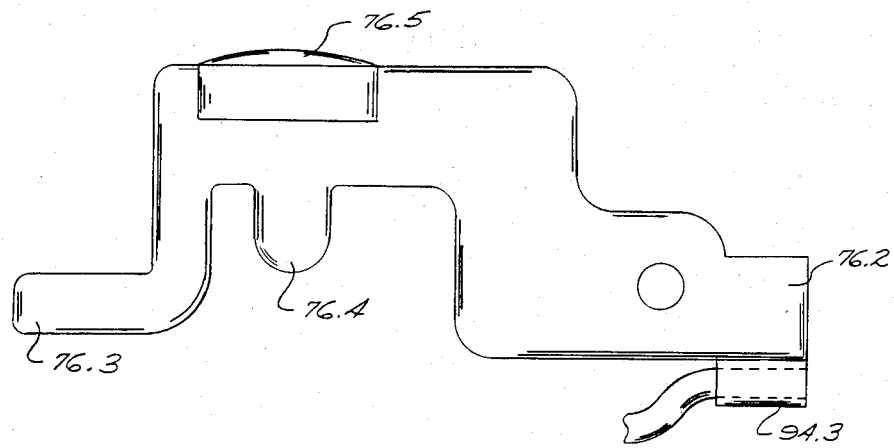
FIG. 12 is an elevational view of the pivotably mounted contact seen in FIG. 9.

With refernece to FIG. 11 terminal T2 is connected to pigtail 94.1 which is connected at 86.4 to one end of current overload bimetal member 86 while the other end of bimetal member 86 is connected at 86.5 to pigtail 94.2 which extends and is attached at 94.3 to end 76.2 of pivotable contact member 76. End 76.2 of the other of the pair of pivotable contact members 76 is connected to pigtail 94.4 at 94.3 which pigtail extends to terminal T1. In the preferred embodiment the pigtail assemblies are resistance brazed to the bimetal member, contact members and terminals with wire wraps crimped onto the pigtails to limit frayed or loose wire strands. The crimp connectors are formed of silver solder brazing material to facilitate this operation.

The electrical circuitry described supra is mounted on portions 96.1, 96.2 of a flexible circuit 96 which are received in grooves in housing 45. Prior to folding and inserting into housing 45 the location of various components is shown in FIG. 17. The following components listed in Table 1 were used in making a circuit control device in accordance with the invention:

TABLE 1

| Q2 | NPN Transistor A5T5058 300 V, 150 m Amp | R1 | 500 ohms | 1¼ w |
|---|---|---|---|---|
| Q3 | NPN Transistor TIP 161 300 V, 10 Amp | R2 | 2K ohms | ¼ w |
| Q4 | SCR 7A 400 V RCA S2600D | R3 | 4 ohms | 1¼ w |
| Q5 | PNP Transistor A5T2907A 60 V, 600 m Amp | R4 | 270 ohms | ¼ w |
| U1 | TI LM 158JG Dual Operational Amplifier | R5 | 33K ohms | ¼ w |
| U2 | O.C.I. Integrated Circuit TI 4N24 | R6 | 68K ohms | ¼ w |
| Z1 | SX30, 30 V, 5W Zener | R7 | 56K ohms | ¼ w |
| Z3 | 1N753A 6.2 V, 400 mW Zener | R8 | 33K ohms | ¼ w |
| Z4 | SX24 24 V, 5w Zener | R11 | 1K ohms | ¼ w |
| Z5 | SW30, 30 V, 5w Zener (DPDT) | R12 | 1 M ohms | ¼ w |
| RL1 | Relay-Teledyne 412-26 | R13 | 33K ohms | ¼ w |
| D1 | 1N5619  600 V, 1 Amp | R14 | 4.7K ohms | ¼ w |
| D2 | 1N5619  600 V, 1 Amp | R15 | 100K ohms | ¼ w |
| D3 | 1N5619  600 V, 1 Amp | R18 | 15K ohms | ¼ w |
| D4 | 1N5619  600 V, 1 Amp | R19 | 6.8K ohms | ¼ w |
| D5 | 1N5619  600 V, 1 Amp | R20 | 1K ohms | ¼ w |
| D6 | 1N5619  600 V, 1 Amp | R21 | 4 ohms | 1¼ w |
| D7 | 1N5619  600 V, 1 Amp | R22 | 470 ohms | ¼ w |
| D8 | 1N5619  600 V, 1 Amp | R23 | 510 ohms | ¼ w |
| D9 | 1N914   75 V, 10 Amps | R24 | 200K ohms | ¼ w |
| D10 | 1N5619  600 V, 1 Amp | C1 | 3.6 μf | 125 V |
| D11 | 1N5619  600 V, 1 Amp | C2 | 6.8 μf | 35 V |
| D12 | 1N914   75 V, 10 m Amp | C3 | 1 μf | 50 V |
| P1 | 130° C. PTC 5.5–9.5 ohms 28 VDC | C4 | 1 μf | 50 V |
| P2 | 130° C. PTC 23–35 ohms 170 VAC | C5 | 3.3 μf | 50 V |
|  |  | C6 | 3.3 μf | 50 V |
|  |  | C8 | .001 μf | 200 V |
|  |  | C9 | .68 μf | 50 V |

Figure 18A:
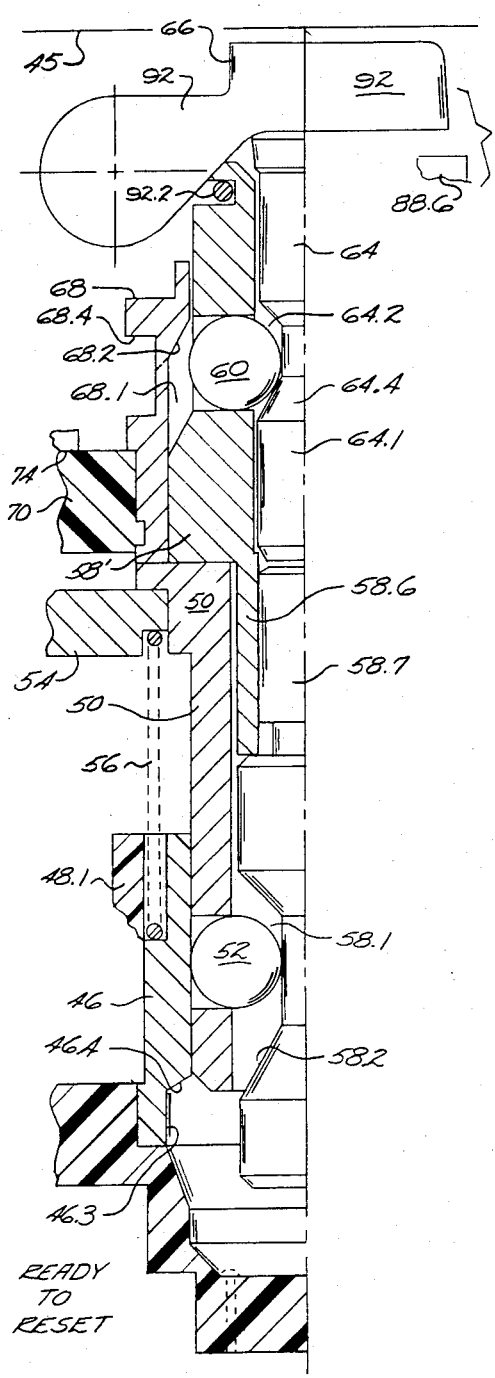
Figure 18B:
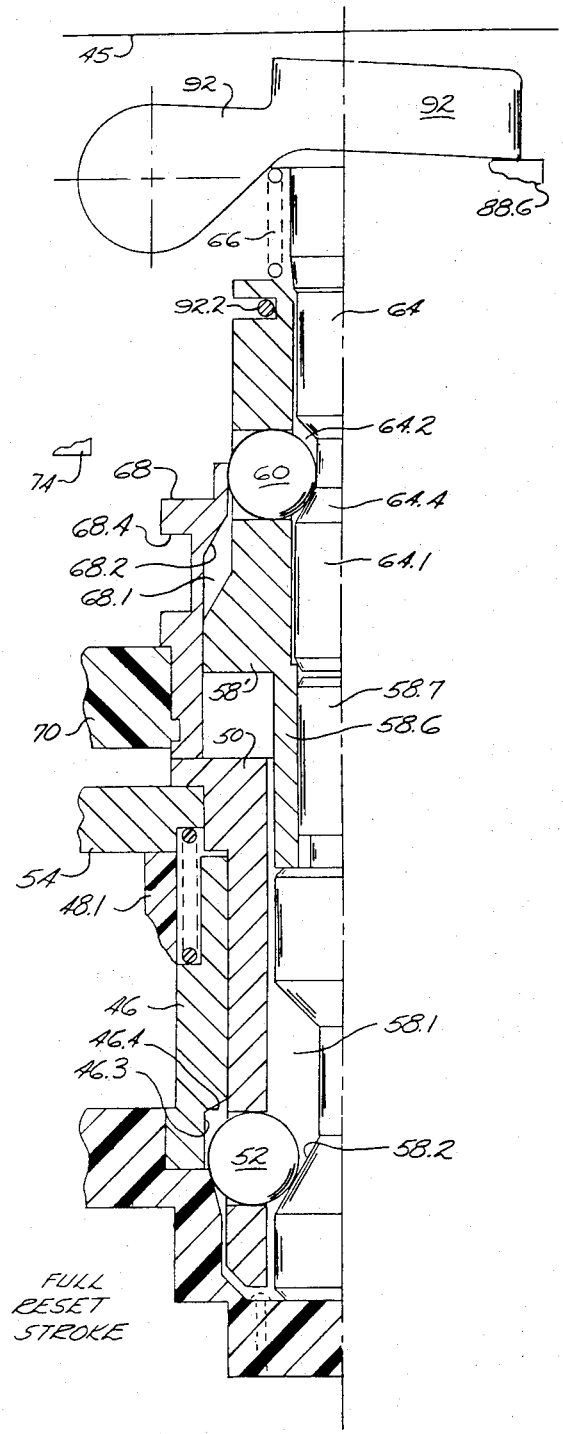
Figure 18E:
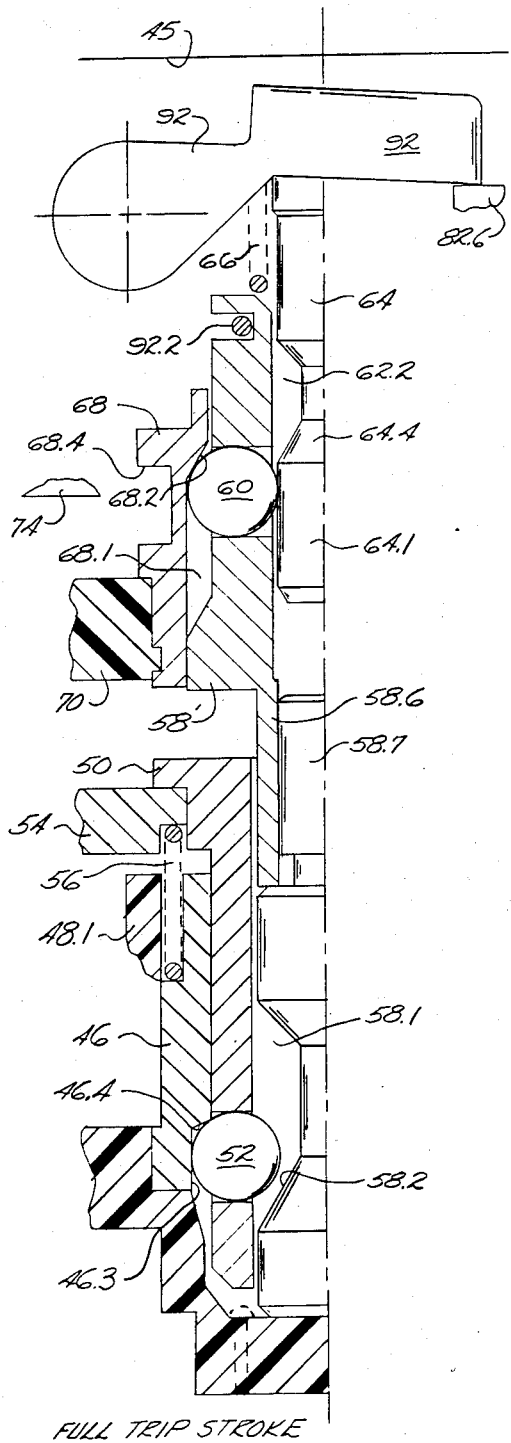
Figure 18F:
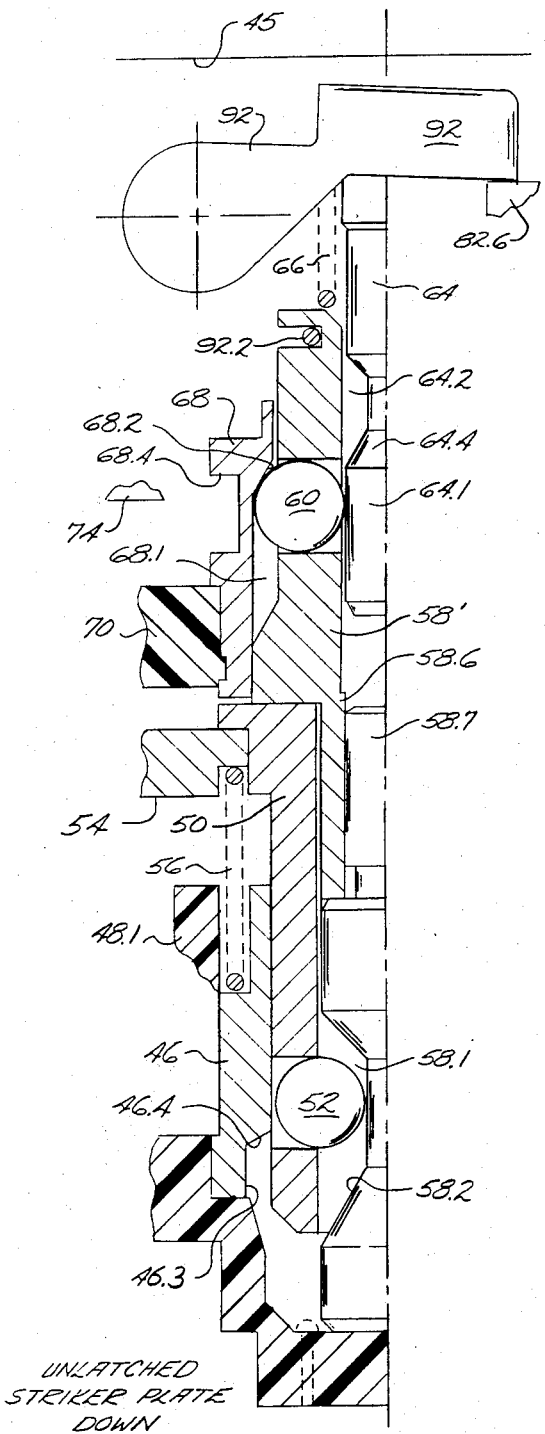

With particular reference to FIGS. 18A to 18F, operation of the push-push mechanism 34, or central stack will be explained. In FIG. 18a and FIG. 18b an alternative form 58' of main plunger 58 is shown comprising an upper portion 58.6 fixedly joined to lower portion 58.7 (see Ready to Reset position of FIG. 18a) which is functionally equivalent to the one piece plunger shown in FIGS. 5–8 but more easily fabricated.

In the initial, contacts open, ready to reset position the main plunger 58' is maintained in its upmost position under the influence of latch member spring 92.2 and contact return spring 56. The striker plate 70 is in its upmost position, limited by the striker plate stop 74 under the influence of the solenoid lever spring 82.7 and the contact return spring 56. The indexing plunger 64 is in its uppermost position limited by the top of the casing 45 under the influence of the indexing plunger spring 66.

With particular reference to FIGS. 5–8, when the ICU 18 is closed, it causes a current pulse to flow through the solenoid 20.1, this causes the solenoid core extension pin 20.3 to hit the lever 82 and pivot it against the bias of the lever spring 82.7 and forces the trip/reset cap 68 downwardly through the lever inserts 82.3. As seen in FIG. 18b, full reset stroke, the camming surface 68.2 of the trip/reset cap 68 forces the indexing balls 60 into the reset recess 64.2 of the indexing plunger 64. The bottom surface of the cap 68, in contact with the top surface of the contact bridge carrier 50, forces it downwardly until either the contact bridge plate hits the boss of the base 48.1 or the carrier 50 hits the bushing 46, the trip/reset cap 68 sliding by the indexing balls 60 positioned in the reset recess. While the latch balls 52 force the main plunger 58' downwardly, the indexing balls force the indexing plunger 64 downwardly, the ball latch surface 58.2 camming the latch balls into the bushing recess 46.3. As the contact bridge carrier 50 descends the bottom surface contacts the actuator pins 84.1 and forces them and the actuator 84 down thereby actuating switches 44, 22, 42 as best seen in FIG. 9. The trip/reset cap mounts the striker plate so that as the cap moves downwardly its motion is transferred to the pivotally mounted contact members 76 through links 80 pivoting them away from the approaching contact bridge plate 54 mounted on the carrier thereby maintaining a selected gap between the contact bridge plate and the pivotable contact member during the reset stroke. Lost motion slot 80.2 allows striker plate 70 to move unimpeded, and hence the solenoid to stroke unimpeded by pivotable contact return springs 78 until the latter portion of the solenoid stroke when its push is highest at the more efficient, nearly closed magnetic circuit condition.

The solenoid is deenergized once the mode switch transfers so that when the plunger reaches its full stroke shown in FIG. 18b, the downward force exerted through the lever inserts 82.3 is removed and the upward bias of the pivotable contact springs 78 and contact bridge return spring 56 cause the carrier to move upwardly until the latch balls 52, maintained in the bushing recess 46.3 by ball latch retainer surface 58.2, limit further upward movement through the camming surface 46.4 of bushing 46. The striker plate 70 and trip/reset cap 68 continue to move uwpardly under the influence of solenoid lever spring 82.7 and contact return springs 78 through the two links 80 until the movable contacts engage with those on contact bridge plate 54, the index balls 60 moving into recess 68.1 of the trip/reset cap 68 as best seen in FIGS. 18c and 18d. The indexing plunger 64 also moves upwardly under the influence of spring 66.

The main plunger 58' is limited in its upward movement through latch balls 52 and surface 46.4 of bushing 46 and 58.2 of main plunger 58'. Index plunger 64 continues to move upwardly with the index balls 60 maintained in recess 68.1 of trip/reset cap 68 by trip index surface portion 64.1 of index plunger 68 (FIG. 18d).

FIG. 18d, Ready to Trip position is the stable load carrying position with the contacts latched in the closed or engaged position. Striker plate 70 is at its uppermost position biased against stop surface 74 and the index plunger 64 is biased against the housing top so that index balls 60 are aligned with trip index portion 64.1 whereas in the FIG. 18a, Ready to Reset position index balls 60 are aligned with reset index portion 64.2.

When the solenoid is actuated by another pulse caused by opening of ICU 18, trip/reset cap 68 is again caused to move downwardly. However, it cannot slide by index balls 60 as it did in moving from FIG. 18a to FIG. 18b due to the alignment of trip index portion 64.1 of index plunger 64. Downward movement of cap 68 therefore now transfers motion through camming surface 68.2, index balls 60 to main plunger 58' which moves latch retainer surface 58.2 downwardly so that latch balls 52 are squeezed out of recess 46.3 into latch recess 68.1 under the influence of contact return spring 56 and pivotable contact spring 78.

Trip/reset cap member 68, contact bridge member 54, main plunger 58', and index plunger 64 now are free to return to their FIG. 18a position under the influence of the several springs.

When the device is in the FIG. 18d engaged contacts position and a thermal overload occurs due to a fault condition causing excessive current to pass through bimetal member 86, the upper portion of bimetal member 86 will bend to the left as viewed in FIGS. 7 and 8 until trip arms 92 are no longer supported on latch surface 88.6. This action effectively removes the upward bias of trip arm springs 92.2 since pin 92.1, to which the springs are keyed, is allowed to move in a clockwise direction now that springs 92.2 no longer have anything against which to react. Thus main plunger 58' is biased downwardly by index plunger spring 66 and the reaction of latch balls 52 against surface 58.2 allowing latch balls 52 to squirt out into the annular latch recess 58.1. It will be seen that the downward push of latch balls 52 on surface 58.2 of plunger 58' is a function of the angle that surface 58.2 forms with the vertical, the diameter of balls 52, the amount of offset in bushing 46, friction and the spring forces of springs 56 and 78. Once the load contacts have separated the contact return spring 56 moves the contact bridge plate 54 upwardly which picks up main plunger 58' and trip arms 92 and turns them to the FIG. 18a position with the trip arms 92 held above latch surface 88.6.

From the above description it will be noted that the status of the load contacts, whether they are in the circuit engaged or disengaged position can be determined by noting the position of main plunger 58'; when the contacts are in the circuit engaged position plunger 58' is down and when the contacts are in the circuit disengaged position plunger 58' is up. When main plunger 58' is up the latch balls are receivable in the reset index recess 64.2 and when plunger 58' is down the latch balls are aligned with trip index portion 64.1. Thus the position of the index plunger 64 relative to the index balls 60 determines the indexing sequence.

FIGS. 19a-19f show a modification of the FIGS. 18a-18f embodiment of the push-push mechanism. In this modification main plunger 58'' is provided with an open bottom end 58.8 formed with an inwardly, radially extending flange 58.9. Telescopically and slidably received within the longitudinally extending bore of plunger 58'' is a latch pin 98 which has a head portion 98.1 having a sufficiently large diameter that flange 58.9 limits outward movement of the latch pin 98 relative to plunger 58''. A ball latch retainer 98.2 is mounted on latch pin 98 and is movable between a first stepped stop surface 98.3 and a second stop surface 98.4 formed by the top surface of a latch spring retainer 98.5 fixedly mounted on latch pin 98. Latch spring 98.6 is received on a seat 98.7 of spring retainer 98.5 and extends between retainer 98.3 and the bottom surface of ball latch retainer 98.2 placing an upward bias on the ball latch retainer.

It will also be observed that an O-ring 100 is shown disposed about the periphery of main plunger 58" and is adapted to absorb impact forces transmitted between plunger 58" and contact bridge plate carrier 50. The O-ring of course may also be used in the FIGS. 18a-18f embodiment. Another modification included in the FIGS. 19a-19f embodiment but useful in either version is the provision of a recess 64.6 at the trip index portion 64.1. It will be observed that trip index recess 64.6 is shallow relative to reset index recess 64.2 and is provided to obtain a more positive indexing action, particularly on applications in which the power source voltage is at the high end of the range of voltages with which the circuit control device can be used. This recess prevents the indexing plunger from slipping past the ball under high momentum and impact conditions occurring during trip operations at high voltage solenoid drive conditions which otherwise might convert what had originally started as a trip operation into a reset operation.

The operation of the push-push mechanism of FIGS. 19a-19f is very similar to that of FIG. 18a-18f thus the entire description will not be repeated. However in relation to the trip pin 98 it will be noted that when trip/reset cap 68 moves downwardly upon energization of the solenoid, force is transmitted to contact plate carrier 50 forcing carrier 50 and latch balls 52 downwardly. Continued downward movement results in latch balls 52 hitting latch retainer surface 98.8 forcing ball latch retainer 98.2 downwardly against the bias of latch spring 98.6 which absorbs some of the impact forces, until retainer 98.2 bottoms out against stop surface 98.4. Continued downward movement forces main plunger 58" down from FIG. 19a to FIG. 19b with latch balls 52 being cammed into latch recess 46.3 by latch retainer surface 98.8.

Contact bridge plate carrier bottoms there against bushing 46, or bridge plate 54 hits housing hub portion 48.1 with the contacts kept out of engagement through link 80 until the end of the stroke of the mechanism when, with the termination of the solenoid pulse caused by the transfer of the mode switch, carrier 50 and bridge plate 54 move upwardly to the FIG. 19c position with surfaces 46.4 of latch recess 46.3 and 98.8 of retainer 98.2 preventing further upward movement. The bias on plunger 58" provides the force to maintain the balls in the latch recess. Overcoming their reaction against the ball latch caused by return spring 56 and pivotable contact springs 78.

Trip/reset cap 68 then continues its upward movement to the FIG. 19d position allowing the contacts to go into the circuit engaged position.

Upon the next energization of the solenoid with index balls 60 aligned with the trip index portion (recess 64.6) of index plunger 64 downward movement of trip/reset cap 68 will cause camming surface 68.2 to transmit its motion to plunger 58" through index balls 60 (FIG. 19e) moving plunger 58" and carrier 50 to the FIG. 19f position. After termination of the driving pulse, the solenoid retracts allowing cap member 68, main plunger 58", and contact plate carrier 50 to come back as a unit urged by the several springs. When latch balls 52 strike camming surface 46.4 of the detent in bushing 46, they are cammed out of the detent into the annulus between the interior wall of sleeve 50 and latch pin 98 since the shoulder of flange 58.9 no longer places an upward force on latch pin 98 allowing ball latch 98.2 to be easily depressed and presents no opposing reaction to the balls escaping the detent.

Latch retainer 99 is advantageously formed with the bottom portion configured as the frustrum of a cone and the top portion configured essentially as half of a sphere to optimize consistent camming action through surface 98.8. Although shown as movable between stops 98.3 and 98.4 it is within the purview of the invention to mount latch retainer 98.2 fixedly on latch pin 98 if so desired.

This type of flexible latch includes several advantages. The floating suspension allows better self-alignment of the four balls (since the surface of the ball latch 98.8 which actually contacts the three balls 52 in the ball carrier is spherical). Further, the latch retainer or ball 98.2 is free to and does turn with pin 98 so that wear is distributed around the contact periphery and deterioration of the surface is avoided. This is very helpful in maintaining the proper force reaction, especially in overload trip operation. Yet another advantage is the fact that the spring loaded latch is superior in vibration characteristics since it allows some amplitude of vibration of the main plunger in vibratory excitation while still maintaining force on the three balls 52.

By way of summary and with particular reference to FIG. 1, the contact assemblies 14, 16 are either in circuit engaged or circuit disengaged positions. Circuit control device 10 operates to transfer from one of these positions to the other and indicates the position via ICU unit 18. Transferring from the circuit disengaged to the circuit engaged position is accomplished by closing ICU unit 18. This switches optical coupler 28, energizes solenoid drive 20 through reset circuit 24 and mode switch 22, moves the contact assemblies to the engaged circuit position, latches the device in that position, operates auxiliary switch 42 and deactivates the feedback circuit to ICU unit 18. The feature of the contact assemblies moving into the circuit engaged position only after the activating pulse is terminated and the solenoid is retracting obviates the possibility of the solenoid holding the contacts closed during an overload for the duration of the activating pulse.

Transferring from the circuit engaged to the disengaged position is accomplished by an operator by opening ICU unit 18 which switches optical coupler 28, energizes solenoid drive 20 through trip circuit 26 and mode switch 22, unlatches the device, moves the contact assemblies to the circuit disengaged position with the pivotable contact members 76 wiping across the surface of the movable contact 54.1 to help maintain them clear of contaminants, operates feedback circuit 30 to ICU unit 18 (this is redundant since ICU 18 is already open) and returns the push-push mechanism to the ready-for-reset position.

Trip operation by a circuit overload effects movement of the contact assemblies to the circuit disengaged position by actuating the bimetal-operated thermal overload mechanism 38 which unlatches the device, moves the contact assemblies to the circuit disengaged position, operates auxiliary switch 42, activates feedback circuit 30 to ICU unit 18, returns the mechanism 34 and mode switch 22 to the ready for reset position and opens ICU unit 18. Device 10 cannot be reset until the fault condition has been cleared and thermal overload mechanism 38 cools sufficiently.

As noted supra, ICU unit 18 serves not only as a remote actuator for device 10 but also as an indicator for the power or load contact status, therefore ICU unit 18 and device 10 must correlate regarding circuit engaged and disengaged positions. Closing of ICU unit 18 moves contact assemblies 14, 16 into the circuit engaged position while opening of ICU unit 18 moves contact assemblies 14, 16 into the circuit disengaged position. An overload trip of device 10 results in opening of ICU unit 18. Further, after a total power loss the paired units automatically assume the same circuit engaged or disengaged position upon restoration of power. If the two units are in the same position when power is restored, no action occurs. However, if ICU unit 18 is open and device 10 is in the circuit engaged position device 10 will move to the circuit disengaged position when power up occurs and conversely if ICU unit 18 is closed and device 10 is in the circuit disengaged position, device 10 will move to the circuit engaged position on power up.

While the above described circuit control system is operable on either alternating or direct voltage on either main or auxiliary power with remote operation and indication via ICU unit 18, it is within the purview of the invention to make use of only certain ones of its features. For example, the system can be used without auxiliary switch 42. The system does not require auxiliary or back up power and, by omission of electronic components required by the universal (alternating or direct current) device, the unit may be used on either direct current or alternating current when the universal application feature is not desired resulting in a lower cost because of the reduction in component cost. Further, it can be used without a feedback circuit for load contact status indication. It is possible to provide remote operation by switching another circuit input to ground, such as point E-2, FIG. 4, using whatever interface is appropriate to the particular application, such as a toggle switch, transistor and so on. In certain applications the degree of isolation needed may not require the use of optical coupler 28. In certain applications it may be desired to do without the electronic circuit and operate the device by a pulse delivered directly to the device by the user's control circuit.

In view of the above, it will be seen that the several objects of the invention are achieved and other advantageous results attained.

As various changes could be made in the above described constructions without departing from the scope of the invention, it is intended that all matter contained in the above description as shown in the accompanying drawings shall be interpreted as illustrative and not in a limiting sense.

I claim:

1. A circuit control device comprising first and second contact assembly means movable relative to one another into circuit engagement and circuit disengagement positions, latching means to latch the contact assembly means in the circuit engagement position,
    a current carrying bimetal member having opposite ends, the current carrying bimetal member anchored at one end,
    an ambient temperature compensating bimetal member having opposite ends, the ambient compensating bimetal member anchored at one end and extending generally parallel to the current carrying bimetal member,
    trip arm means comprising a pair of trip arms pivotably mounted at the opposite end of one of the bimetal members,
    a generally rectangular latch plate having an open central portion and having first and second opposite ends attached to the opposite end of the other bimetal member, the latch plate having a latch surface formed at the first end of the plate adapted to engage the trip arms, the trip arms extending through the open central portion, the latch surface location moving with changes in ambient temperature to maintain generally the same spatial relationship with the trip arm means,
    the latching means being interconnected with the trip arm means, and
    biasing means adapted to place a selected bias on the latching means tending to maintain the contact assembly means latched in the circuit engagement position only when the trip arm means are in engagement with the latch surface.

2. A circuit control device according to claim 1 in which the attachment of the latch plate to the one of the bimetal members is adjustable so that the location of the latch surface relative to the other bimetal member can be selectively adjusted.

3. A circuit control device comprising first and second contact assembly means movable relative to one another into circuit engagement and circuit disengagement positions, latching means to latch the contact assembly means in the circuit engagement position,
    a support,
    a current carrying bimetal member having opposite ends, the current carrying bimetal member anchored in the support at one opposite end and mounting a block at the other opposite end,
    an ambient compensation bimetal member having opposite ends, the ambient compensation bimetal member anchored in the support at one opposite end, a latch element having a latch surface attached to the other opposite end of the compensation bimetal member, the latch element being a generally rectangular plate having an open central portion and having first and second opposite ends, the latch surface formed at the first end of the plate, and trip arm means pivotably mounted on the block and adapted to engage the latch surface, the trip arm means comprising a pair of trip arms which extend from the block through the open central portion of the plate, the latch surface location moving with changes in ambient temperature to maintain generally the same spatial relationship with the trip arm means.

4. A circuit control device according to claim 3 in which the current carrying bimetal member comprises a bimetallic strip which extends back and forth several times between the opposite ends.

5. A circuit control device according to claim 3 in which the trip arm means is operatively connected to the latching means, the contact assembly means being adapted to be latched when the trip arm means engages the latch surface.

6. A circuit control device according to claim 3 in which the first end of the plate is bent downwardly at one extremity of the open central portion forming an upwardly facing edge, the edge serving as the latch surface.

7. A circuit control device according to claim 6 in which a tab is formed at the first end of the plate extending upwardly from a portion of the edge, an aperture is formed in the tab and an adjustable fastening means extends from the said other opposite end of the ambient compensating bimetal through the aperture in the tab.

8. A circuit control device according to claim 7 in which the second end of the plate is slidingly supported on the block disposed at the said other opposite end of the current carrying bimetal.

9. A circuit control device according to claim 8 in which the block has a projection extending upwardly therefrom and the plate has a slot in communication with the second end of the plate, the projection of the block disposed in the slot.

* * * * *